US012792888B2

(12) United States Patent
Tripathi et al.

(10) Patent No.: US 12,792,888 B2
(45) Date of Patent: Nov. 10, 2026

(54) ACCELERATION OF 2D DILATED CONVOLUTION FOR EFFICIENT ANALYTICS

(71) Applicant: TEXAS INSTRUMENTS INCORPORATED, Dallas, TX (US)

(72) Inventors: Varun Tripathi, Gurgaon (IN); William Leven, Dallas, TX (US); Pramod Swami, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 712 days.

(21) Appl. No.: 18/067,089

(22) Filed: Dec. 16, 2022

(65) Prior Publication Data

US 2024/0202500 A1 Jun. 20, 2024

(51) Int. Cl.
*G06N 3/0464* (2023.01)
*G06N 3/045* (2023.01)
*G06N 3/063* (2023.01)

(52) U.S. Cl.
CPC ........... *G06N 3/0464* (2023.01); *G06N 3/045* (2023.01); *G06N 3/063* (2013.01)

(58) Field of Classification Search
CPC ........ G06N 20/00; G06N 20/10; G06N 20/20; G06N 3/02; G06N 3/04; G06N 3/045; G06N 3/0464; G06N 3/06; G06N 3/063
See application file for complete search history.

(56) References Cited

U.S. PATENT DOCUMENTS

2022/0164674 A1* 5/2022 Jang .................... G06N 3/0464
2023/0376732 A1* 11/2023 Zhao ..................... G06N 3/045

* cited by examiner

*Primary Examiner* — Shane D Woolwine
(74) *Attorney, Agent, or Firm* — Michelle F. Murray; Frank D. Cimino

(57) ABSTRACT

Disclosed herein are improved systems and methods for accelerated 2D dilated convolution. A processor determines an offset based on a dilation factor of the 2D dilated convolution. The processor selects rows of data from the 2D input in phases based on the offset and loads an input feature panel without overwriting data that has not yet been consumed by the 2D dilated convolution processor. As the 2D dilated convolution processor performs the convolution iterations, the processor continues to load additional data for the convolution. As the convolution iterations are completed, the processor spaces result of the 2D dilated convolution into a matrix such that results of each phase are spaced based on the offset.

20 Claims, 17 Drawing Sheets

700

705

| NETWORK | NETWORK CYCLES (MegaCycles) | UPDATED NETWORK CYCLES (MegaCycles) | IMPROVEMENT (PERCENT) | NUMBER OF DILATED LAYERS |
|---|---|---|---|---|
| jSegNet21v2_2MP | 44.14 | 38.47 | 12.85 | 6 |
| jsegNet_u16 | 28.83 | 23.747 | 17.63 | 6 |
| jdepthmodSegNet | 22.52 | 19.85 | 11.86 | 9 |

710

| SERIAL NUMBER | Fr | Fr | Lx | Ly | Hgt. | Wdt. | Ni | No | NUMBER GROUPS | CYCLES (PREVIOUS) | CYCLES (NEW) | GAIN |
|---|---|---|---|---|---|---|---|---|---|---|---|---|
| 1 | 3 | 3 | 2 | 2 | 24 | 48 | 320 | 320 | 320 | 119783 | 51484 | 2.33 |
| 2 | 3 | 3 | 4 | 4 | 24 | 48 | 320 | 320 | 320 | 132744 | 60652 | 2.19 |
| 3 | 3 | 3 | 6 | 6 | 24 | 48 | 320 | 320 | 320 | 148430 | 66525 | 2.23 |
| 4 | 5 | 5 | 2 | 2 | 24 | 48 | 320 | 320 | 320 | 262542 | 91252 | 2.88 |
| 5 | 5 | 5 | 4 | 4 | 24 | 48 | 320 | 320 | 320 | 328257 | 10067 | 3.26 |
| 6 | 5 | 5 | 6 | 6 | 24 | 48 | 320 | 320 | 320 | 386636 | 117068 | 3.30 |
| 7 | 7 | 7 | 2 | 2 | 24 | 48 | 320 | 320 | 320 | 571057 | 128170 | 4.46 |
| 8 | 7 | 7 | 4 | 4 | 24 | 48 | 320 | 320 | 320 | 746684 | 145679 | 5.13 |
| 9 | 7 | 7 | 6 | 6 | 24 | 48 | 320 | 320 | 320 | 919544 | 148267 | 6.20 |

FIG. 7

ACCELERATION OF 2D DILATED CONVOLUTION FOR EFFICIENT ANALYTICS

TECHNICAL FIELD

Aspects of the disclosure are related to the field of deep neural networks and, in particular, to two-dimensional (2D) dilated convolution.

BACKGROUND

Two-dimensional dilated convolution is a method implemented in machine learning and is a basic building block of deep neural networks (DNN). It is designed to convolve a 2D input signal with a weighted filter to generate a 2D output. Typical applications of 2D dilated convolution are employed by deep neural networks (DNNs) executed on an embedded system. In the field of image processing. DNNs trained to perform 2D dilated convolution are generally utilized for tasks such as image classification or image manipulation.

Current methods of 2D dilated convolution related to image processing are memory intensive due to the amount of data that requires analysis. Within an embedded system, standard methods of 2D dilated convolution rely heavily on memory to store data waiting to be analyzed. Components of the embedded system are in constant communication to fetch data required for the convolution, and in some instances the same data is fetched repeatedly because algorithms may be used that require overwriting data that is needed again. Consequently, there are inefficiencies that reduce speed and increase resource and processor use within such systems and algorithms.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method for accelerated 2D dilated convolution. A processor of the computer may determine an offset based on a dilation factor of the 2D dilated convolution associated with an image. The processor may select rows of data from the image for the 2D dilated convolution in phases based on the offset. The processor may space results of the 2D dilated convolution at each of the phases based on the offset. Other embodiments of this aspect include corresponding computer systems, apparatus, and computer programs recorded on one or more computer storage devices, each configured to perform the actions of the methods.

Implementations may include one or more of the following features. In some embodiments, identifying the offset may include selecting the dilation factor as the offset. In some embodiments, the processor may supply a filter vector to the 2D dilated convolution. In some embodiments, selecting the rows of data from the image for the 2D dilated convolution in phases based on the offset may include, in each phase of a number of phases, where the number of phases is based on the dilation factor, loading data into an input feature panel of the 2D dilated convolution based on applying a dilated filter that includes filter coefficients to a set of rows of an input feature map that includes the data from the image, where the set of rows is selected based on the offset. In some embodiments, in each of the phases, the processor may supply a filter vector that includes the filter coefficients ordered based on the offset and the loading the data. In some embodiments, in each of the phases, the processor may shift the dilated filter down the offset number of rows of the input feature map such that the loading the data into the input feature panel implements vertical reuse, and the loading is repeated until the dilated filter has been shifted to the end of the input feature map. In some embodiments, spacing the results of the 2D dilated convolution at each of the phases based on the offset may include storing the results for each phase in rows of a convolution result matrix starting with an uppermost unfilled row and continuing in rows separated by the offset. Implementations of the described techniques may include hardware, a method or process, or computer software on a computer-accessible medium.

Another general aspect includes a system that has a hardware accelerator. The hardware accelerator may include an input feature panel memory, a convolutional result memory, and a filter vector memory. The system may also include a controller and a memory. The memory stores instructions that, upon execution by the controller, cause the controller to coordinate the 2D dilated convolution using the hardware accelerator. The controller may receive an input feature map and determine an offset based on a dilation factor. The controller may also implement a loading plan to carry out more than one phase of 2D dilated convolution based on the dilation factor. Each phase may include applying a dilated filter to the input feature map to load values into the input feature panel memory nonsequentially based on the offset for a convolution iteration and instructing the hardware accelerator to perform the convolution iteration. The controller may also implement an output plan that includes retrieving values from the convolutional result memory on completion of the convolution iteration and storing the values in a row of a convolution result matrix based on the offset. Other embodiments of this aspect include corresponding computer systems, apparatus, and computer programs recorded on one or more computer storage devices, each configured to perform the actions of the methods.

Implementations of this aspect may include one or more of the following features. In some embodiments, the system may include a camera, and the controller may access images captured by the camera and convert the image into an input feature map. In some embodiments, the input feature map may be a matrix having one or more columns and one or more rows. In some embodiments, applying the dilated filter to the input feature map may include shifting the dilated filter horizontally across the input feature map by a factor of one (1) until the dilated filter has been shifted to an end of the row of the input feature map. In some embodiments, the values loaded from the input feature map into the input feature panel memory comprise values from rows of the input feature map to which the dilated filter is newly applied. In some embodiments, the dilated filter may include filter coefficients separated by the dilation factor. In some embodiments, implementing the loading plan further may include loading the filter coefficients into the filter vector memory based on the offset for the convolution iteration. Implementations of the described techniques may include hardware, a method or process, or computer software on a computer-accessible medium.

Another general aspect includes a method of executing dilated convolution. The method may include a controller receiving an input feature map and executing a phase of a number of phases of dilated convolution of the input feature map, where the number of phases is based on a dilation factor of the dilated convolution. The phases may include the controller selecting a starting row of the input feature map for the phase. The phases may further include convolving an input feature panel with a filter vector in iterations. A convolution iteration may include the controller applying a dilated filter to the input feature map, where the dilated filter may include a set of filter coefficients separated by the dilation factor. The convolution iteration may further include the controller loading a set of values into an input feature panel based on applying the dilated filter to a set of rows of the input feature map to implement vertical reuse. The convolution iteration may further include a convolution processor accessing a filter vector that includes the set of filter coefficients and convolving the filter vector with the input feature panel to generate an output. The convolution iteration may further include the controller assigning the output to a selected row of a convolution result matrix where the selected row is selected based on the dilation factor and the phase. The convolution iteration further includes the controller shifting the dilated filter down the input feature map based on the dilation factor. Convolution iterations are repeated until the dilated filter has been shifted to an end of the input feature map, and additional phases are executed until each of the phases are executed. Other embodiments of this aspect include corresponding computer systems, apparatus, and computer programs recorded on one or more computer storage devices, each configured to perform the actions of the methods.

Implementations of this aspect may include one or more of the following features. In some embodiments, to implement vertical reuse, the set of values comprises values from rows from the input feature map to which the dilated filter is newly applied. In some embodiments, selecting the starting row may include selecting an uppermost row of the input feature map that has not yet had dilated filter applied. In some embodiments, loading the set of values into the input feature panel may include shifting the dilated filter horizontally across the input feature map by a factor of one, until the dilated filter has been shifted to an end of the row of the input feature map. In some embodiments, accessing the filter vector further may include the controller loading the filter coefficients into the filter vector based on the vertical reuse. In some embodiments, accessing the filter vector may include accessing a memory storing a number of filter vectors that each include the filter coefficients in a different order and selecting the filter vector from the number of filter vectors based on the vertical reuse. Implementations of the described techniques may include hardware, a method or process, or computer software on a computer-accessible medium.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 7 illustrates exemplary result data showing improvements in resource usage with a system employing the improved method of 2D dilated convolution described herein.

DETAILED DESCRIPTION

Various implementations are disclosed herein that describe systems and methods to accelerate two-dimensional (2D) dilated convolution. In various implementations, processing circuitry described herein may be configured to perform 2D dilated convolution using phases that allow data reuse. The processing circuitry can perform convolution phases such that the data is processed nonsequentially (i.e., out-of-order) by the processing circuitry to ensure the data reuse. The data reuse reduces the number of memory writes over traditional algorithms because data that has not been yet processed is not overwritten and then later re-fetched. By processing the data nonsequentially, overwrites are reduced and processor cycles are reduced. These reductions increase speed, performance, and efficiency of the system. Specific results are provided in FIG. 7 that show the speed improvement due to the reduction in resource usage.

Figure 3A:
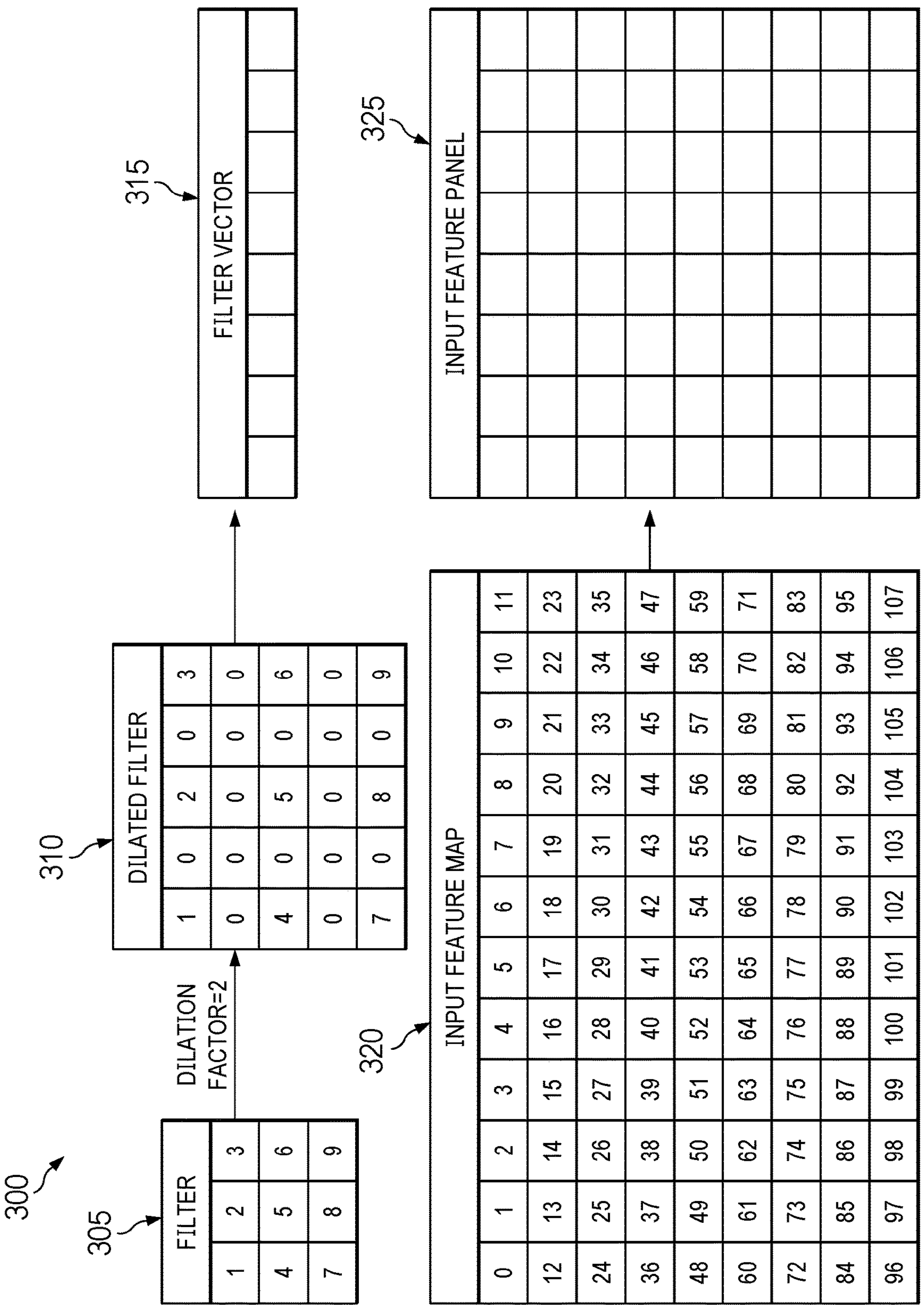
FIG. 3A illustrates a 2D dilated convolution loading process, according to some embodiments.

To accelerate the 2D dilated convolution, the processing circuitry may be configured to load the input feature map (e.g., an input tensor) values nonsequentially into an input feature panel using phases based on the dilation factor as described in detail with respect to FIG. 3A. Each phase includes the processing circuitry iteratively convolving the input feature map values with a filter coefficient that is ordered according to the order of the data in the input feature map. The processing circuitry may be configured to perform the iterative convolution such that data is not overwritten before use. As such, the processing circuitry nonsequentially outputs the data and nonsequentially processes the output to ensure the final result is properly ordered for a complete solution to the 2D dilated convolution without sacrificing vertical reuse of the data in the input feature panel as described in detail herein.

Figure 1:
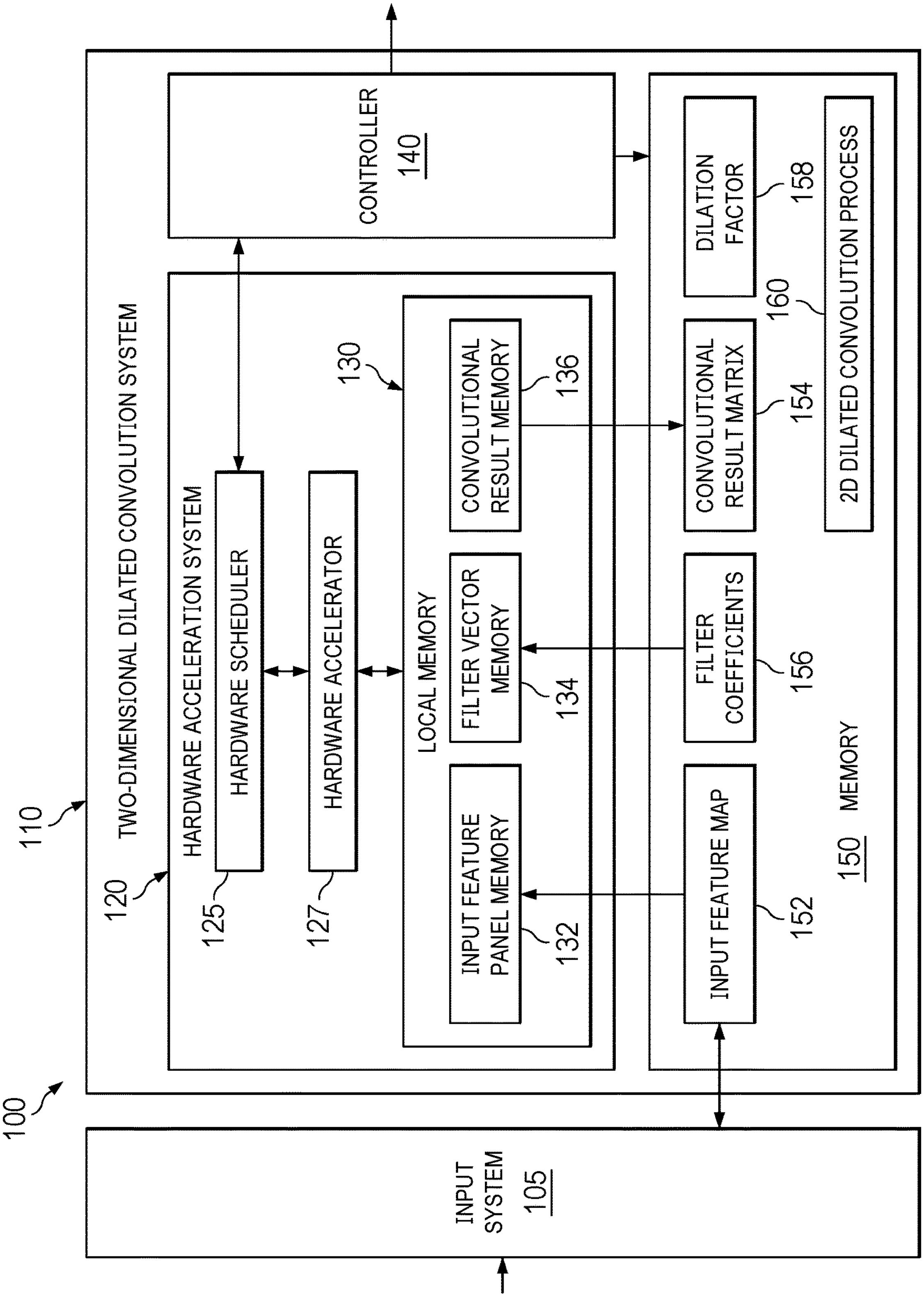
FIG. 1 illustrates an exemplary high-level system architecture, according to some embodiments.

Turning now to the drawings, FIG. 1 illustrates an exemplary system 100 that may implement accelerated 2D dilated convolution. System 100 includes input system 105 and Two-dimensional (2D) dilated convolution system 110. System 100 may be implemented in a larger system, such as, for example, a vehicle with a vision system or any other system that may utilized classification and/or analysis that may utilize 2D dilated convolution system 110. In some embodiments, system 100 may be implemented in a computing system, such as, for example, a cloud-based system that offers cloud-based services including 2D dilated convolution.

Input system 105 may be any type of system that receives, captures, or creates an input signal that may be analyzed using 2D dilated convolution in 2D dilated convolution system 110. For example, input system 105 may include a vision system that captures video or images that may be analyzed using 2D dilated convolution. For example, input system 105 may be a camera (e.g., a sensor triggered camera), in some embodiments. In some embodiments, input system 105 may be a receiving component that receives input that can be analyzed with 2D dilated convolution system 110. For example, input system 105 may be an input or receiving component of a cloud-based service that uses 2D dilated convolution. Input system 105 is depicted as a single input, but any number of sensors, receivers, or other components may be included in input system 105 that provide input into 2D dilated convolution system 110 to be analyzed with 2D dilated convolution.

Two-dimensional dilated convolution system 110 may be or may be incorporated into a system on a chip (SoC), an application specific integrated chip (ASIC), a digital signal processor (DSP) or any other implementation of a hardware accelerator. Two-dimensional dilated convolution system 110 may be implemented into any computing system (e.g., as processing circuitry) that can perform the algorithm described without departing from the spirit of the disclosure. For example, more or fewer components than those described may be used to implement the features described for accelerating 2D dilated convolution. More specifically, hardware acceleration system 120 may not be implemented in some embodiments where a specific hardware accelerator is not used to implement 2D dilated convolution. As depicted, 2D dilated convolution system 110 may include hardware acceleration system 120, controller 140, and memory 150. Two-dimensional dilated convolution system 110 may perform 2D dilated convolution for one or more layers in a deep neural network (DNN) in some embodiments. While only the 2D dilated convolution features, elements, and functionality are described, other features, elements, and functionality of the DNN may be performed in pre- and/or post-layers not described herein for case of description.

Hardware acceleration system 120 is depicted and described here as hardware specific, however the particular implementation in hardware need not be used in some embodiments. For example, in some embodiments a hardware accelerator 127 is not used to perform 2D dilated convolution, yet the algorithm described herein may improve any 2D dilated convolution implementation. Hardware acceleration system 120 may be incorporated in an SoC, DSP, or ASIC in some embodiments. Hardware acceleration system 120 may include hardware scheduler 125, hardware accelerator 127, and local memory 130.

Hardware scheduler 125 may be a component in hardware acceleration system 120 that provides scheduling functionality to hardware accelerator 127. In some embodiments, hardware scheduler 125 implements a memory mapped register (MMR) that configures scheduling activities for one or more hardware accelerators 127. Hardware scheduler 125 may be configured to manage scheduling threads of activities within hardware acceleration system 120 including initiating execution of activities by hardware accelerator 127. Hardware scheduler 125 may be further configured to manage configuration of direct memory access (DMA) channels that allow memory reads and writes between local memory 130 and memory 150.

Hardware accelerator 127 may be a specific processor and/or processing circuitry that performs specific computations quickly. Hardware accelerator 127 may be configured to perform 2D convolution calculations. Specifically, hardware accelerator 127 is configured to convolve data that is in input feature panel memory 132 and filter vector memory 134 and store the result into convolutional result memory 136. Because hardware accelerator 127 is configured for such a specific task, it performs desired calculations very quickly. While a single hardware accelerator 127 is depicted, multiple hardware accelerators 127 may be incorporated into hardware acceleration system 120. In some embodiments, other hardware accelerators 127 may perform the same or different calculations. In other words, there may be multiple hardware accelerators 127 that perform the same or substantially similar calculations, which may ensure multiple threads can quickly execute 2D dilated convolution because multiple hardware accelerator 127 are available to perform calculations. However, there may be other hardware accelerators that perform different calculations that are not shown here for ease of description. Those hardware accelerators may be incorporated to perform other tasks relevant to analysis of the input from input system 105, for example.

Local memory 130 may be a memory stored in hardware acceleration system 120 that is specific to hardware acceleration system 120. Local memory 130 may include any type of memory such as volatile and nonvolatile, removable and non-removable memory implemented in any method or technology for storage of information, such as computer readable instructions, data structures, program modules, memory, or other data. Examples of memory include random access memory (RAM), read only memory (ROM), programmable ROM, erasable programmable ROM, electronically erasable programmable ROM, solid-state drives, magnetic disks, optical disks, optical media, flash memory, virtual memory and non-virtual memory, magnetic cassettes, magnetic tape, magnetic disk storage or other magnetic storage devices, or any other suitable storage media. In no case is local memory 130 a propagated signal. Local memory 130 may be a fast access memory for hardware accelerator 127 because it is dedicated memory for hardware acceleration system 120. Further, local memory 130 may be physically close to hardware accelerator 127, which also may speed access time. Local memory 130 includes input feature panel memory 132, filter vector memory 134, and convolutional result memory 136. Input feature panel memory 132, filter vector memory 134, and convolutional result memory 136 may each be, for example, dedicated areas of local memory 130 for storing their respective data and may be, in some embodiments, buffers or eaches. Input feature panel memory 132 may be used to store data from input feature map 152 as described further below. Filter vector memory 134 may be used to store a set of filter coefficients (i.e., the filter vector). In some embodiments, the filter coefficients are rewritten in the relevant order for each convolution iteration as needed as described in more detail herein. In other embodiments, the filter coefficients can be stored in the filter vector memory 134 in various orders for the convolution iterations, and the relevant order is used for the given convolution iteration. Convolutional result memory 136 is configured to store the result of the convolution of the data in input feature panel memory 132 and filter vector memory 134. Local memory 130 may store other data that is not included here for ease of description.

Controller 140 may include a microprocessor and/or other processing circuitry capable of executing instructions. Controller 140 may be configured to manage execution of 2D dilated convolution based on the 2D dilated convolution process 160. In some embodiments, controller 140 may be considered a DNN engine. Controller 140 may preprocess data from input system 105. For example, the input received from input system 105 may need processing to turn the input into input feature map 152 that is used for the 2D dilated convolution. Additionally, controller 140 may perform the operations in 2D dilated convolution process 160 that include loading data from input feature map 152 into input feature panel memory 132, ensuring the proper filter vector is available to hardware accelerator 127 by loading the filter coefficients 156 into the filter vector memory 134 in the correct order, and instructing the hardware scheduler 125 to convolve the data. Once a convolution iteration has occurred, controller 140 may obtain the output from the convolutional result memory 136 and place it in the appropriate location in the convolutional result matrix 154. Controller 140 may further manage the phases and convolutional iterations needed to complete the entire 2D dilated convolution.

Memory 150 may be any memory that can be accessed by controller 140. Memory 150 may include any type of memory such as volatile and nonvolatile, removable and non-removable memory implemented in any method or technology for storage of information, such as computer readable instructions, data structures, program modules, or other data. Examples of memory include random RAM, ROM, programmable ROM, erasable programmable ROM, electronically erasable programmable ROM, solid-state drives, magnetic disks, optical disks, optical media, flash memory, virtual memory and non-virtual memory, magnetic cassettes, magnetic tape, magnetic disk storage or other magnetic storage devices, or any other suitable storage media. In no case is memory 150 a propagated signal (e.g., a transitory signal). Memory 150 includes input feature map 152, convolutional result matrix 154, filter coefficients 156, dilation factor 158, and 2D dilated convolution process 160. Memory 150 may include other data and instructions that are not included here for ease of description.

Input feature map 152 may be any data from input that is processed by processing circuitry in system 100 into input feature map 152 that can be loaded into input feature panel memory 132 for convolution by hardware accelerator 127. The examples shown describe an implementation of fully grouped 2D dilated convolution in which each output feature map is a function of one input feature map. The acceleration methods described herein may be used with other variants of 2D dilated convolution without departing from the spirit of this disclosure. For example, partially grouped or ungrouped 2D dilated convolution may be performed using the acceleration described. Input feature map 152 may be data that describes an image that has been processed for convolution. For example, an image may be processed by the processing circuitry into a 2D input tensor that is input feature map 152. The input feature map 152 may include pixel data for the image. The process for loading the input feature map 152 into the input feature panel memory 132 is described in detail with respect to FIGS. 3A-4J.

Convolutional result matrix 154 may be used by processing circuitry in system 100 to store the result of the 2D dilated convolution. As the convolution iterations are performed in each phase of the 2D dilated convolution by hardware acceleration system 120, the data from convolutional result memory 136 is obtained by the processing circuitry and placed in the proper location in the convolutional result matrix 154. The process for loading the convolution result matrix is described in detail with respect to FIGS. 3A-4J.

Figure 2:
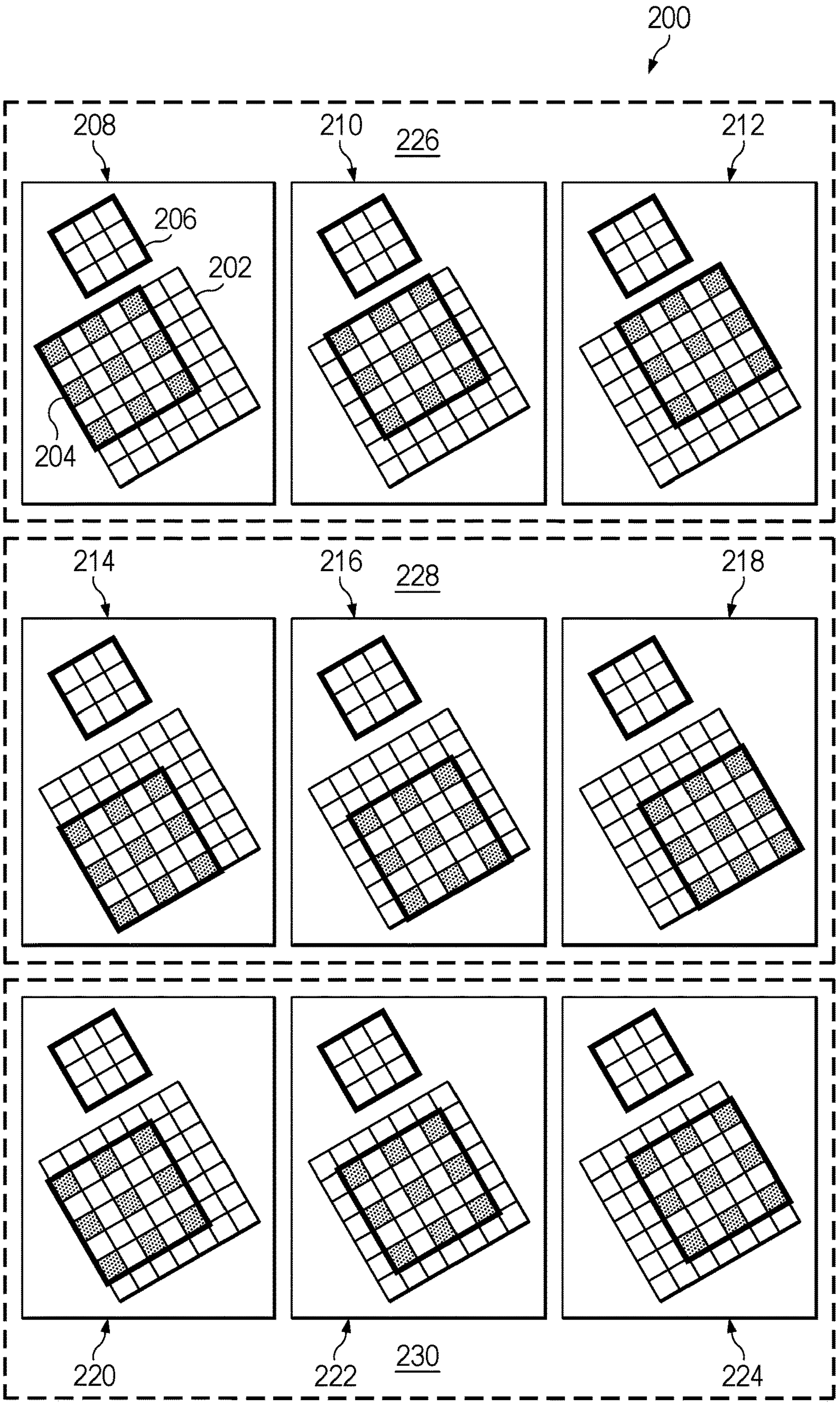
FIG. 2 illustrates a series of illustrations describing the process of 2D dilated convolution, according to some embodiments.

Filter coefficients 156 may be the filter coefficients in the filter used for the 2D dilated convolution. In 2D convolution, the processing circuitry applies a filter to a 2D input. The filter is a set of filter coefficients arranged as a matrix. The series of illustrations shown in FIG. 2 depict the process of applying the filter to 2D data in a matrix, such as, for example, pixel data. In dilated convolution, the matrix of filter coefficients is dilated by a dilation factor. Holes are inserted into the filter to expand the size based on the dilation factor. For a dilation factor of 2, one hole is inserted between each of the filter coefficients. In other words, for example, a 3-by-3 filter becomes a 5-by-5 filter with a dilation factor of 2, which is shown with respect to FIG. 2. The filter coefficients 156 are used for the convolution and may be reordered to account for the convolution iteration and phase of convolution as described in more detail herein. The filter coefficients 156 are loaded into the filter vector memory 134 for use by hardware accelerator 127.

Dilation factor 158 is the dilation factor used by the processing circuitry for the convolution. The processing circuitry uses dilation factor 158 to determine the phase of the convolution as well as for implementation of the loading plan for loading the input feature map 152 into input feature panel memory 132.

Two-dimensional dilated convolution process 160 may be a set of instructions executed by controller 140 used to manage the 2D dilated convolution.

In use, input system 105 may provide an input to memory 150 for convolution by 2D dilated convolution system 110. 2D dilated convolution system 110 may perform the 2D dilated convolution using the dilation factor 158, which may be predetermined or may be determined, for example, based on the input. Two-dimensional dilation convolution process 160 may provide the instructions to controller 140 to manage the process. Controller 140 may preprocess the input to generate input feature map 152. Controller 140 may implement a loading plan that loads data from input feature map 152 into input feature panel memory 132 in portions so that convolution iterations are performed in a number of phases. The number of phases is equal to the dilation factor 158. For example, if the dilation factor 158 is two (2), there are 2 phases implemented. For each phase, controller 140 loads sets of data from input feature map 152 into input feature panel memory 132. The controller 140 selects the data sets based on applying the filter (the filter coefficients 156 separated by the dilation factor 158 in a matrix form) to the input feature map 152. Controller 140 may also load the filter coefficients 156 into filter vector memory 134. Controller 140 may instruct hardware scheduler 125 to initiate execution of a first convolution iteration. Hardware scheduler 125 may instruct hardware accelerator 127 to perform the convolution. Hardware accelerator 127 may convolve the input feature panel memory 132 with the filter vector memory 134 and insert the output into convolutional result memory 136. Controller 140 may receive indication that the convolution iteration is complete and implement an output plan that loads the convolutional result memory 136 into a row of the convolutional result matrix 154 based on the phase and convolution iteration, which is described in more detail with respect to FIGS. 4A-4J. Once the output is obtained, controller 140 may continue to load data from the input feature map 152 to input feature panel memory 132 following the loading plan based on the phase and the convolution iteration and repeat the process with the next convolution iteration. The process repeats until all convolution iterations for all phases are complete and the convolutional result matrix 154 is filled with the final convolution result. Controller 140 may output the final result from convolutional result matrix 154 to a next layer of the DNN or to any other component that may utilize the result.

FIG. 2 illustrates a series of drawings that depict a loading process 200 of 2D dilated convolution. Loading process 200 depicts how dilated filter 204 moves across and down the input feature map 202 nonsequentially. Loading process 200 is used to load data from input feature map 202 into an input feature panel by applying dilated filter 204 such that the loaded data is ready to be convolved.

Input feature map 202 may be a matrix which stores values related to an input. In an implementation, such input may include image data that describes the individual pixels of an image. As such, the number of pixels within the image corresponds to the number of elements within input feature map 202. For example, an image with a pixel resolution of 320×240 pixels will be mapped to a matrix with 320×240 corresponding elements. Each element of input feature map 202 stores image data related to the element's corresponding pixel. For example, such image data may include a pixel's RGB value, which describes the red, green, and blue color intensity within the pixel.

Filter 206 includes the filter coefficients that are applied to input feature map 202 and that are later convolved with the input feature panel. A 2D dilated convolution system can apply the filter coefficients to input feature map 202 in a matrix configuration. For example, as depicted, filter 206 is a 3×3 matrix, where each value in the matrix is a filter coefficient. The filter coefficients are weighted values related to the 2D dilated convolution. For example, filter 206 may store weighted values corresponding to image classification and/or analysis.

Dilated filter 204 includes the filter coefficients (black squares) separated by null values (white squares), at a rate of the dilation factor. More specifically, the dilation factor of a filter defines an amount of space to be inserted between the weighted values of the filter. In an implementation, a filter is dilated by inserting null values between weighted values as delegated by the dilation factor. In operation, when dilated, a filter, such as dilated filter 204, is able to analyze a wider field of view at the same computational cost. As shown in FIG. 2, dilated filter 204 is illustrated as 5×5 matrix, which is generated by applying a dilation factor of two to filter 206. The dilation factor may be any value, and filter 206 may be any size, such that dilated filter 204 may also be any size. The examples shown are for visual efficiency.

In an implementation, a 2D dilated convolution system applies dilated filter 204 to input feature map 202 for a first iteration 226 by applying dilated filter 204 across the rows of input feature map 202. As shown in 208, the 2D dilated convolution system applies dilated filter 204 beginning with the upper left corner of dilated filter 204 applied beginning at the upper left corner of input feature map 202, so that the upper left corner of each matrix is aligned. The 2D dilated convolution system moves dilated filter 204 one column at a time across input feature map 202 in 210 and again in 212 until all the values of the first set of rows have had the filter applied in the first iteration 226. During the application of dilated filter 204 to input feature map 202, the 2D dilated convolution system loads data from input feature map 202 that is overlapped by weighted values of dilated filter 204 into the input feature panel. Simultaneously, data that is overlapped by null values is ignored. Note that with a dilation factor of two as shown, the second and fourth rows of input feature map 202 have null values from dilated filter 204 applied across the entirety of the rows, and their values are therefore ignored in the first iteration 226.

In the second iteration, the data is loaded nonsequentially. Note that in previous systems, loading of the third iteration 230 would be performed next. However, to implement data reuse, as described in more detail with respect to FIGS. 3A-4J, the 2D dilated convolution system is configured to perform the second iteration 228 before the third iteration 230. In the second iteration 228, the second row of input feature map 202 is skipped, and the dilated filter 204 is moved down to the third row of input feature map 202. The number of rows skipped is based on the dilation factor. If the dilation factor were 3, for example, rows two and three would be null in the first iteration 226, and the second iteration would move the dilated filter down three rows to row 4. Because the dilation factor is 2 in this example, the dilated filter 204 is moved down 2 rows to row 3, and that set of rows are loaded as shown in 214, 216, and 218.

In the third iteration, the second phase begins. The number of phases is equal to the dilation factor. The remainder of the first phase is not shown here for simplicity, however, the previous iterations 226 and 228 would have included continuing to move the dilated filter 204 down the input feature map 202 by the dilation factor (2) rows until the entire input feature map is processed for the first phase. Then the second phase begins by the 2D dilated convolution system moving the dilated filter 204 to the uppermost row that has not yet had the dilated filter 204 applied. In this example, row 2 was all null in the first iteration 226, so row 2 is the uppermost row that has not yet had the dilated filter 204 applied. The dilated filter 204 is moved to the furthest left element of row 2 in the third iteration 230 at 220 and moved one column across in 222 and 224. The process continues by moving the dilated filter 204 down the dilation factor in the next iteration for the second phase. In the example, the next iteration would begin at row 4.

FIG. 3A illustrates another, more detailed, loading process 300 of 2D dilated convolution. Loading process 300 includes filter 305, dilated filter 310, filter vector 315, input feature map 320, and input feature panel 325. Loading process 300 is used by a controller or processor (i.e., processing circuitry; e.g., controller 140) to load data from input feature map 320 into input feature panel 325 in preparation to perform a convolution. The controller loads the data into input feature panel 325 in a number of stages where the number of loading stages is dependent on the amount of data received from the signal.

Filter 305 may be a matrix that stores weighted values related to a convolution. Filter 305 may include the filter coefficients, such as filter coefficients 156 as described with respect to FIG. 1. In the field of image processing, weighted values correspond to a method of image analysis. For example, weighted values may relate to an image classification process performed via convolution of an image. Weighted values of filter 305 are used with a dilation factor (e.g., dilation factor 158) to create the dilated filter 310 depicted.

Dilated filter 310 may be a matrix which stores the filter coefficients (i.e., weighted values) of dilated filter 310 separated by a rate of the dilation factor. The dilation factor describes the amount of space to be inserted between weighted values of the matrix. As illustrated by FIG. 3A, loading process 300 has a dilation factor of 2, though this is for example purposes only. Given a dilation factor of 2, in operation, weighted values from filter 305 are loaded by a factor of 2, such that weighted values are separated by one null value. Dilated filter 310 is applied to input feature map 320 to load overlapping values into input feature panel 325. Overlapping values describe weighted values of dilated filter 310 that overlap data of input feature map 320.

Input feature map 320 may be, for example, input feature map 152 as described with respect to FIG. 1. Input feature map 320 may be a matrix that stores data related to an input. For example, input feature map 320 can store pixel data that describes an image. The size of input feature map 320 is dependent on the size of the input. Relating back to the example, an image with a pixel resolution of 10×10 pixels, results in a 10×10 input feature map 320, such that elements of the 10×10 input feature map 320 are loaded with data of the corresponding pixel. As illustrated in FIG. 3A, input feature map 320 received an input spanning a 9×12 matrix, and therefore input feature map 320 is a 9×12 matrix.

Input feature panel 325 may be a memory location that is used for performing the 2D dilated convolution. For example, input feature panel 325 may be input feature panel memory 132 as described with respect to FIG. 1.

In an implementation, a controller loads a 2D input signal that carries image data corresponding to individual pixels of an image input feature map 320. For example, such data may include a pixel's RGB value, hex value, hue saturation lightness (HSL) value, or a color value of the like. The controller loads image data from input feature map 320 into input feature panel 325 in a series of loading iterations and phases that allow data reuse. Data reuse describes the recycling of data that has already been loaded but not fully processed, further explained in FIGS. 4A-4J. The controller loads the data into input feature panel 325 via repeated applications of dilated filter 310.

In operation, dilated filter 310 is applied to input feature map 320 in a number of loading iterations and a number of phases. For example, in a first loading iteration of a first loading phase, the controller overlays dilated filter 310 onto input feature map 320 such that the upper left elements of each matrix are aligned. The controller shifts dilated filter 310 horizontally across input feature map 320, by a factor of 1, and loads overlapping values into input feature panel 325. Overlapping values describe data from input feature map 320 that overlap weighted values (i.e., filter coefficients rather than null values) of dilated filter 310. Simultaneously, data that is overlapped by null values is ignored. Execution of the first iteration of loading is complete once dilated filter 310 reaches an end of the row of input feature map 320. Upon completion of the loading iteration, loading process 300 generates a corresponding filter vector 315.

Filter vector 315 may be a matrix that stores values related to the convolution to be performed. Filter vector 315 may be the filter coefficients of filter 305 arranged in order for the convolution iteration. Filter vector 315 may be filter vector memory 134 as described with respect to FIG. 1. In an implementation, loading process 300 loads weighted values (i.e., filter coefficients) from filter 305 to filter vector 315 based on the data loaded into input feature panel 325. Filter vector 315 is loaded with values such that loading process 300 can implement vertical reuse. In the first iteration, the filter 305 values are loaded in order because the first iteration of the loading process 300 loads the data from input feature map 320 in order. In the second iteration, however, the order of the data for processing in the input feature panel 325 will be out of order, such that the uppermost rows of the input feature panel 325 will be filled with data that is nonsequential for processing, which will be described in more detail in FIGS. 4A—4J. Execution of loading process 300 results in the generation of an input feature panel 325 and its associated filter vector 315.

Figure 3B:
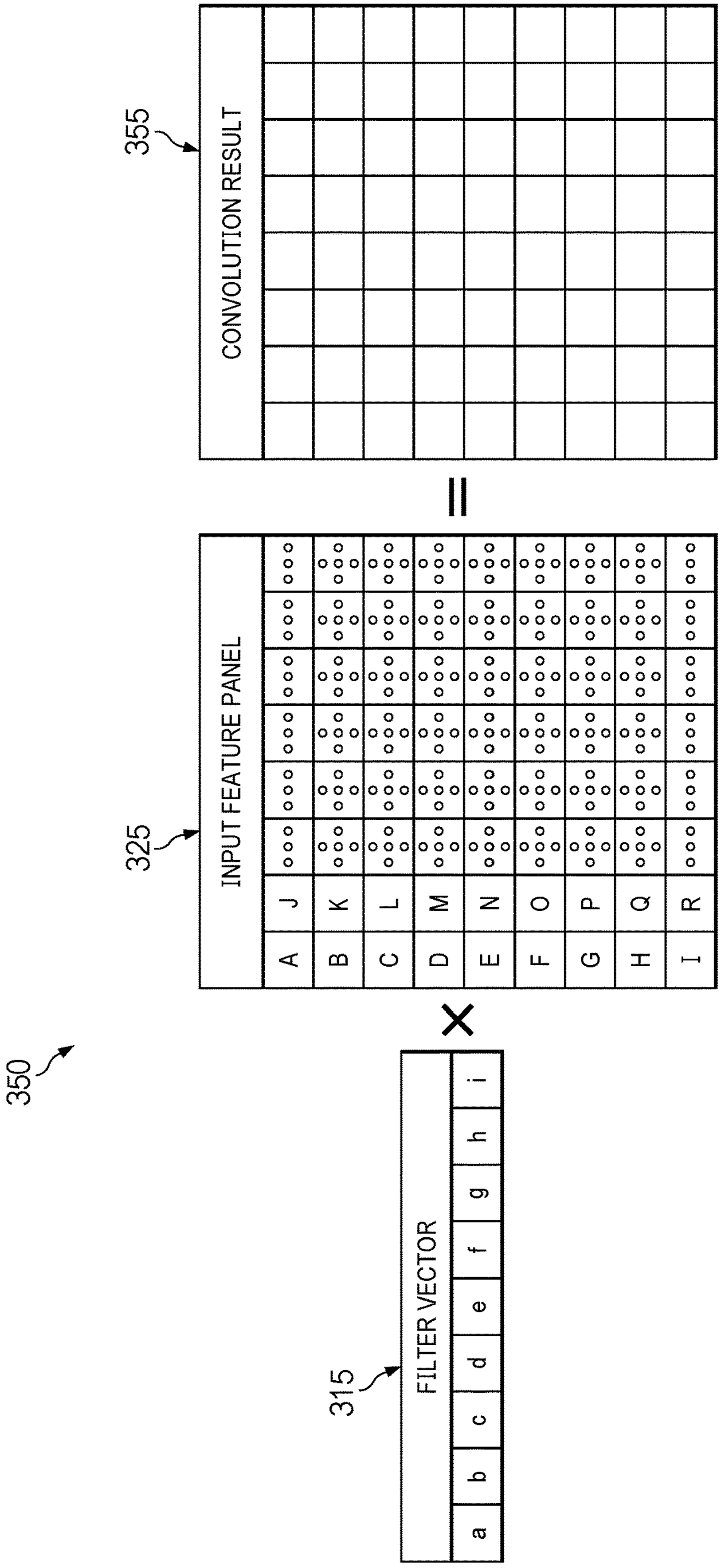
FIG. 3B illustrates a 2D dilated convolution computation process, according to some embodiments.

Now turning to the next drawing, FIG. 3B illustrates a computation process 350 of 2D dilated convolution. Computation process 350 includes filter vector 315, input feature panel 325, and convolution result 355. Computation process 350 may be performed by a convolution processing system such as hardware acceleration system 120. The convolution processing system uses the outputs of loading process 300 to perform a convolution. Once the input feature panel 325 and filter vector 315 are loaded with values for a convolution iteration, the convolution processing system performs the convolution and outputs the result to convolution result 355. Not shown is that each iteration results in a row of the convolution result that may be stored in a memory such as convolution result memory 136 as described with respect to FIG. 1.

Convolution result 355 may be, for example, convolution result matrix 154 as described with respect to FIG. 1. Resulting output is loaded into convolution result 355 based on the iteration and phase of the convolution. The first iteration of a phase is loaded into the uppermost open row of convolution result 355 (e.g., the output from the first iteration for the first phase is loaded into the first row of convolution result 355). Thereafter, the results are loaded into rows based on skipping rows based on the dilation factor for each iteration (e.g., the output from the second iteration for the first phase is loaded into the third row of convolution result 355 since the dilation factor in our example is 2, and the output from the third iteration for the first phase is loaded into the fifth row of convolution result 355). In other words, the number of rows skipped at each iteration is based on an offset selected based on the dilation factor. The output from the first iteration of the second phase is loaded into the second row of convolution result 355, and so forth.

FIGS. 4A-4J illustrate an example implementation of the loading and computation processes for convolution iterations and phases. Beginning with FIG. 4A, loading environment 400 includes filter 405, filter vector 410A, input feature map 425, input feature panel 430A, loaded input feature panel 430B and dilated filter 420. Loading environment 400 processes are executed by processing circuitry, for example controller 140 as described with respect to FIG. 1. In loading environment 400, the controller executes a first iteration of a first phase of a loading process. The number of phases is equal to the dilation factor for the dilated convolution. In this example, the dilation factor is 2, and the number of phases is therefore 2. The number of iterations within each phase is dependent upon the amount of data in the input feature map 425.

Filter 405 may include a matrix of filter coefficients or weighted values to apply to the input feature map 425 for performing 2D dilated convolution. Filter 405 may include filter coefficients such as filter coefficients 156 as described with respect to FIG. 1. Filter 405 may be substantially the same as filter 305 as described with respect to FIG. 3A. Filter vector 410A may include the filter coefficients ordered for the convolution as explained further below. Filter vector 410A may be filter vector memory 134 as described with respect to FIG. 1. Filter vector 410A may be substantially the same as filter vector 315 as described with respect to FIG. 3A.

Input feature map 425 contains data associated with a 2D input signal. For example, such signal may carry image data corresponding to the pixels of an image. Input feature map 425 may be input feature map 152 as described with respect to FIG. 1 or input feature map 320 as described with respect to FIG. 3A. Elements of the input feature map 425 matrix store image data of a corresponding pixel, as an example. In operation, dilated filter 420 is applied to input feature map 425 to load values into input feature panel 430.

Dilated filter 420 includes weighted values, represented as black squares, separated by null values at the rate of the dilation factor. Dilated filter 420 may be dilated filter 204 as described with respect to FIG. 2 or dilated filter 310 as described with respect to FIG. 3A. As illustrated, dilated filter 420 has a dilation factor of 2, but in other implementations the dilation factor can be any number greater than 1. Dilated filter 420 represents a dilated version of filter 405, such that the first row of filter 405 aligns with row 420A, the second row of filter 405 aligns with row 420B, and the third row of filter 405 aligns with row 420C of dilated filter 420.

In operation, the controller applies dilated filter 420 to input feature map 425 to load data into input feature panel 430A. The controller shifts dilated filter 420, by a factor of one (1), horizontally across input feature map 425, and as it is applied, loads overlapping values into input feature panel 430A. While described as shifting by a factor of one (1), other horizontal shifting offsets may be used in some embodiments. Overlapping values describe data from input feature map 425 that is overlapped by black squares of dilated filter 420. Black squares represent the weighted values of filter 405, while white squares represent null values.

The controller shifts dilated filter 420 to an end of the row of input feature map 425 to populate input feature panel 430 as shown in input feature panel 430B. Input feature panel 430B stores values for a first convolution iteration. In an implementation, in addition to populating input feature panel 430B, the controller generates or populates filter vector 410A. Filter vector 410A is a vector that has values from filter 405 loaded, including filter coefficients 412, filter coefficients 414, and filter coefficients 416. Filter coefficients 412 correspond to the weighted values (i.e., filter coefficients) in the first row of filter 405, filter coefficients 414 correspond to the weighted values in the second row of filter 405, and filter coefficients 416 correspond to the weighted values in the third row of filter 405. Filter coefficients 412, 414, and 416 also correspond to the rows of dilated filter 420 since the dilated filter 420 is filter 405 dilated by the dilation factor. Accordingly, filter coefficients 412 align with row 420A, filter coefficients 414 align with row 420B, and filter coefficients 416 align with row 420C.

Figure 4A:
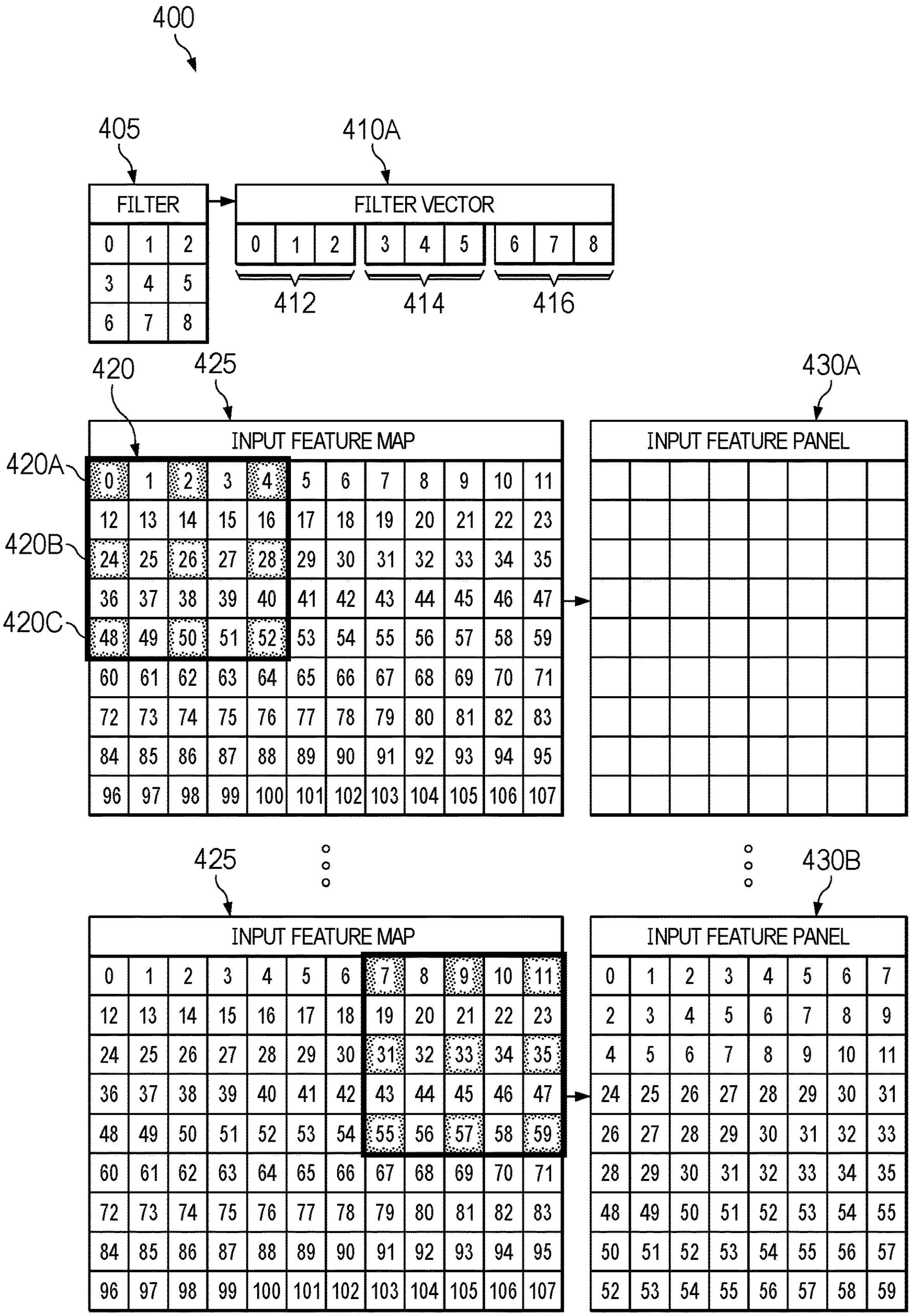
FIGS. 4A-4J illustrate further details of the loading and computation process of 2D dilated convolution, according to some embodiments.
Figure 4B:
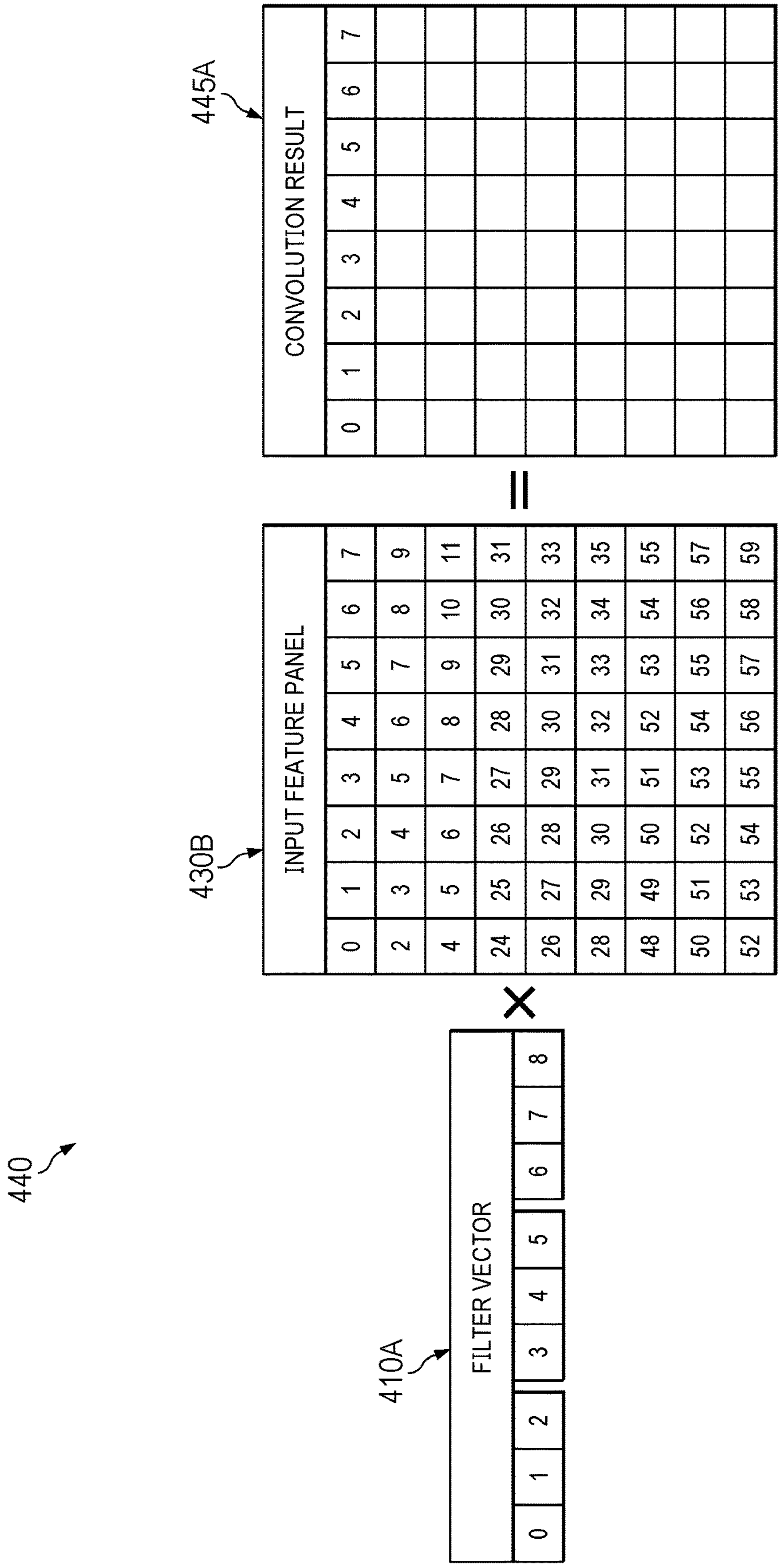
Figure 4C:
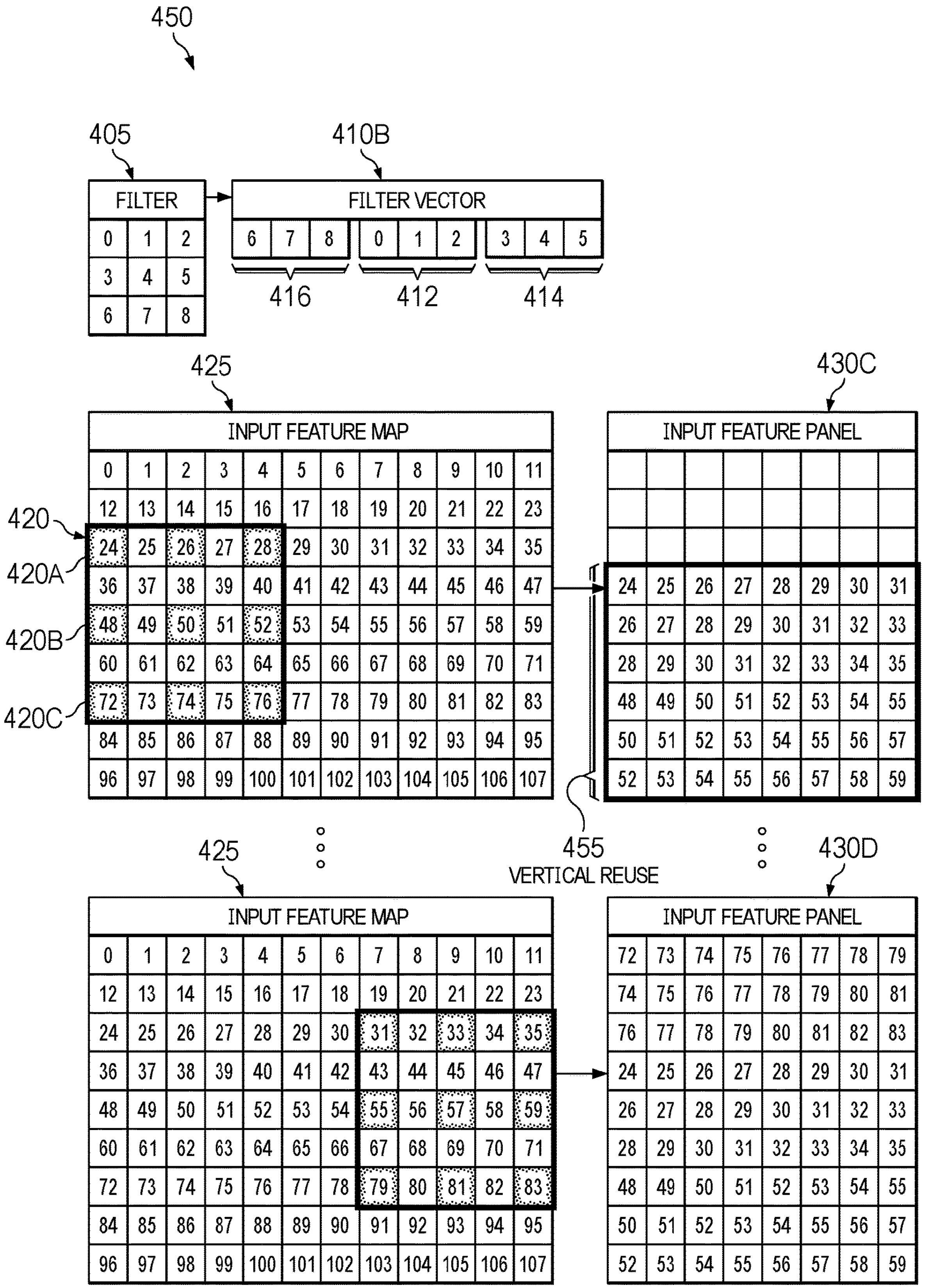

Turning to FIG. 4B, computation environment 440 is depicted. The computation process described with respect to computation environment 440 may be performed by processing circuitry including an accelerator system. For example, hardware accelerators such as hardware accelerator 127 as described with respect to FIG. 1 may perform the convolution. The process of loading the convolution output into convolution result 445 may be performed by, for example, controller 140 as described with respect to FIG. 1. The process described for loading environment 400 loaded values into the memories that are used to perform the convolution. The computation process of computation environment 440 executes the first convolution iteration of the first phase. For example, a hardware accelerator may convolve filter vector 410A with input feature panel 430B. A single row results as output from the convolution, and the hardware accelerator may store the output in a memory such as convolution result memory 136 as described with respect to FIG. 1. The row is stored in convolution result 445A. Convolution result 445A may be convolution result matrix 154 as described with respect to FIG. 1.

At each iteration, the results are loaded into convolution result 445 based on the iteration and the phase. The first iteration of each phase is stored in the uppermost empty row of the matrix. Each following output is stored in a row that is selected by skipping rows based on an offset that equals the dilation factor. For example, the controller will store the second iteration result in the third row of convolution result 445 since the dilation factor is 2. The convolution iterations continue for the phase until the end of the input feature map 425 is reached. The second phase begins, and the controller loads the data into empty rows starting at the top of the convolution result 445 as will be shown in more detail in the following figures.

Upon loading output to convolution result 445A, the controller executes a next iteration of the loading process. As illustrated in loading environment 450 shown in FIG. 4C, the controller executes the next iteration of loading. Loading environment 450 includes the same elements as loading environment 400, altered to fit the requirements of the convolution.

Input feature panel 430C stores data from the previously loaded data. In this iteration of the convolution, when the controller shifts the dilated filter 420 vertically as described below, the first three rows of the input feature panel will no longer be needed because the dilated filter 420 will not be applied to the corresponding row (i.e., row 1) of the input feature map 425. Accordingly, the controller clears the first three rows of the input feature panel 430C, and the controller saves the six (6) remaining rows for vertical reuse of reuse data 455. To avoid overwriting data that is still needed, the controller loads the new data into the first three rows of input feature panel 430, and reuse data 455 is maintained. As a result, data in input feature panel 430 is out of order in this iteration, and the controller reorders filter coefficients of filter vector 410B to account for the nonsequential data in input feature panel 430.

To load the new data, the controller vertically shifts dilated filter 420 down input feature map 425 by a rate of the dilation factor. In the example here, the dilation factor is two (2), so the controller shifts the dilated filter 420 down to align row 420A of the dilated filter 420 with the third row of input feature map 425. The controller shifts dilated filter 420 across input feature map 425 to load new values into input feature panel 430C. New values describe values that have the dilated filter 420 newly applied and are therefore yet to be loaded from input feature map 425 into input feature panel 430. In this example, the controller loaded reuse data 455 based on data that now corresponds to the rows overlapped by rows 420A and 420B of the dilated filter 420. Thus, the controller loads new values input feature map 425 to input feature panel 430D corresponding to data overlapped by row 420C of dilated filter 420.

In operation, the controller shifts dilated filter 420 horizontally across input feature map 425 to load new data into input feature panel 430D. The controller loads the new data from input feature map 425 to the empty elements of input feature panel 430C to result in input feature panel 430D.

As previously described, the controller reorders filter vector 410B. Specifically, the controller reorders filter coefficients 412, 414, and 416 such that the filter coefficients are aligned to the data to which they were applied. Filter coefficients 412, 414, and 416 correspond to row 420A, 420B, and 420C of dilated filter 420, respectively. As a result, filter coefficients 412, 414, and 416 correspond to the data to which dilated filter 420 was applied. For example, as illustrated in loading environment 450, data loaded via application of row 420C corresponds to the first 3 rows of input feature panel 430D. As a result, the first filter coefficients in filter vector 410B are filter coefficients 416 that correspond to row 420C. Next, data loaded via application of row 420A corresponds to the second 3 rows of input feature panel 430D. As a result, filter vector 410B next has filter coefficients 412. Finally, data loaded via application of row 420B corresponds to the last three rows of input feature panel 430D. As such, filter vector 410B has next in order filter coefficients 414.

Figure 4D:
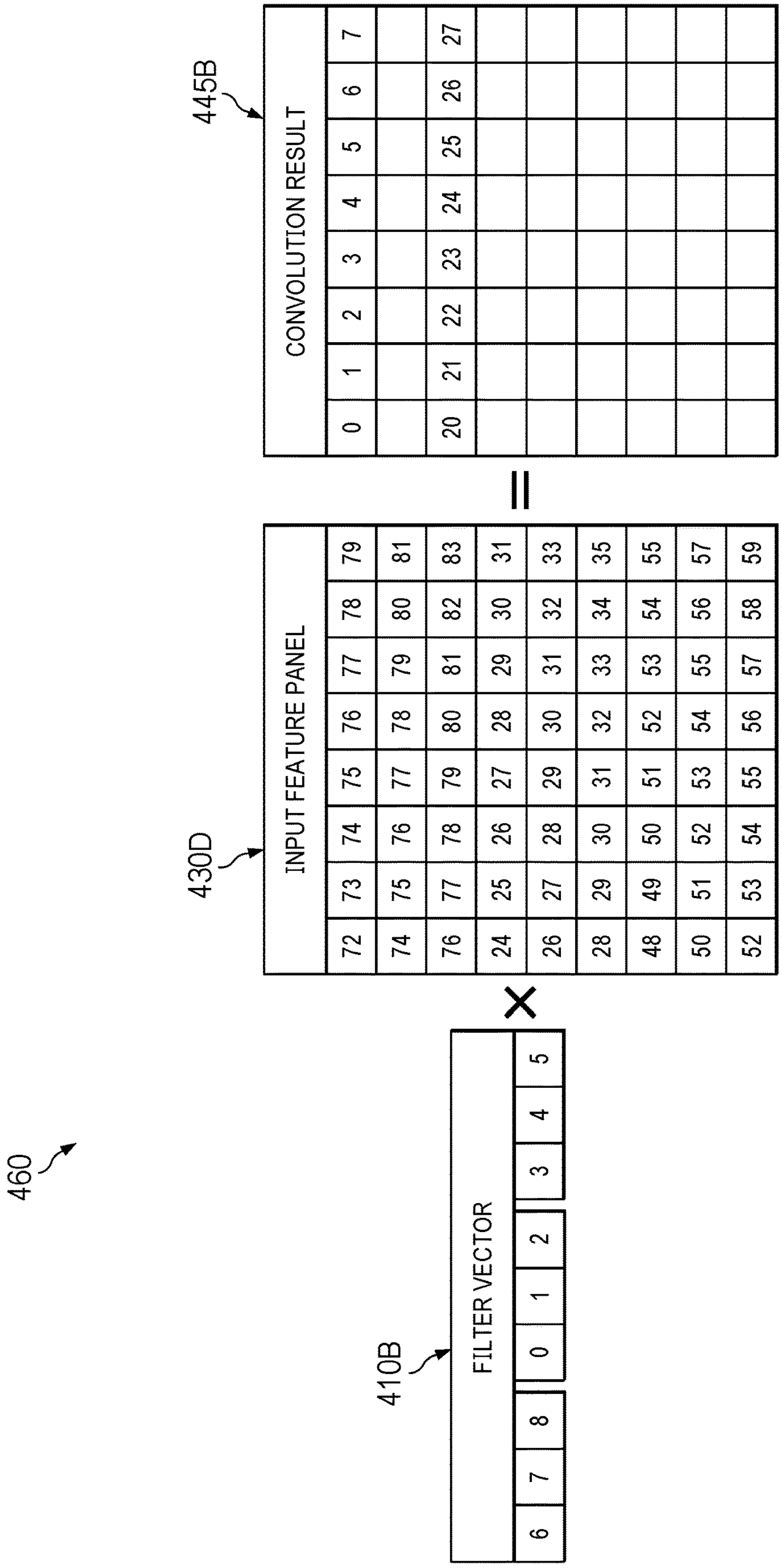

Now turning to FIG. 4D, a second iteration of the first phase of convolution is performed. The processing circuitry convolves filter vector 410B with input feature panel 430D to generate an output. The controller maps the output to a row that is offset from the last row of loaded data values by the dilation factor. In this example, the dilation factor is 2, so the controller loads the second output into the third row of convolution result 445B.

Figure 4E:
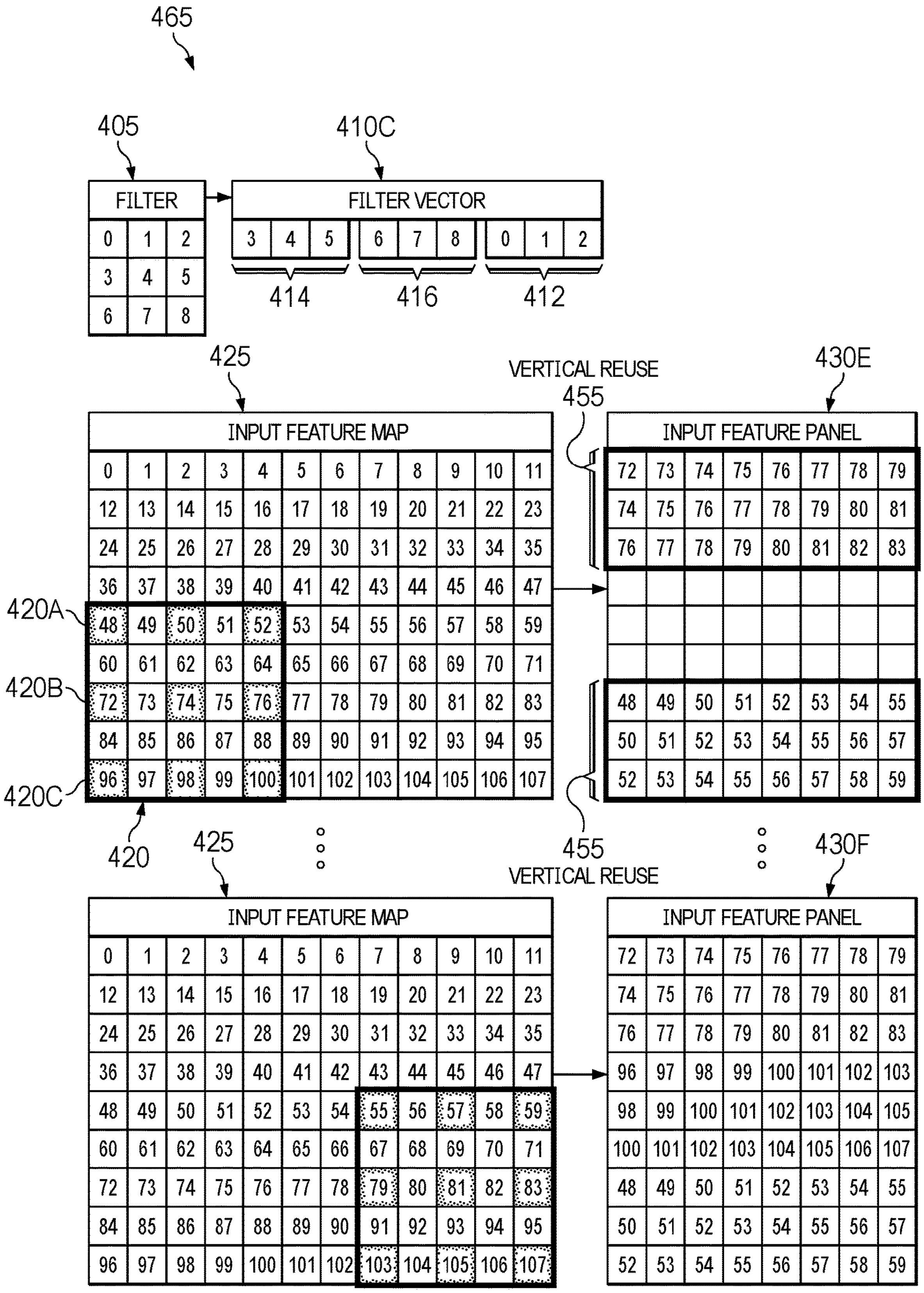

Upon loading output to convolution result 445B, the processing circuitry executes the next convolution iteration in the first phase. As illustrated in FIG. 4E, loading environment 465 includes the same elements as the previous loading environments, adjusted based on the convolution iteration to be performed.

Input feature panel 430E again stores data from the previously loaded data. In this iteration of the convolution, when the controller shifts the dilated filter 420 vertically by the dilation factor, the first three rows of the input feature panel 430 and the last three rows of the input feature panel 430 will be reused, but the middle three rows of the input feature panel 430 will no longer be needed because the dilated filter 420 will not be applied to the corresponding row (i.e., row 3) of the input feature map 425. Accordingly, the controller clears the middle three rows of the input feature panel 430E, and the controller saves the six (6) remaining rows (i.e., the first three and the last three) for vertical reuse of reuse data 455. To avoid overwriting data that is still needed, the controller loads the new data into the middle three rows of input feature panel 430 and maintains reuse data 455. As a result, data in input feature panel 430 is out of order in this iteration, and the controller reorders filter coefficients of filter vector 410C to account for the nonsequential data in input feature panel 430.

To load the new data, the controller shifts the dilated filter 420 vertically down input feature map 425 by a rate of the dilation factor. In the example here, the dilation factor is 2, so the controller shifts the dilated filter 420 down to align row 420A of the dilated filter 420 with the fifth row of input feature map 425. The controller shifts dilated filter 420 across input feature map 425 to load new values into input feature panel 430E. New values describe values that have the dilated filter 420 newly applied and are therefore yet to be loaded from input feature map 425 into input feature panel 430. In this example, the controller loaded reuse data 455 based on data that now corresponds to the rows overlapped by rows 420A and 420B of the dilated filter 420. Thus, the new values loaded from input feature map 425 to input feature panel 430D correspond to data overlapped by row 420C of dilated filter 420.

In operation, the controller shifts dilated filter 420 horizontally across input feature map 425 to load new data into input feature panel 430D. The controller loads the new data from input feature map 425 to the empty elements of input feature panel 430C to result in input feature panel 430F.

As described above with respect to FIG. 4C, the controller reorders filter vector 410C. In this iteration, as illustrated in loading environment 450, data loaded via application of row 420B corresponds to the first 3 rows of input feature panel 430F. As a result, the first filter coefficients in filter vector 410C are filter coefficients 414 that correspond to row 420B. Next, data loaded via application of row 420C corresponds to the second 3 rows of input feature panel 430F. As a result, filter vector 410C next has filter coefficients 416. Finally, data loaded via application of row 420A corresponds to the last three rows of input feature panel 430F. As such, filter vector 410C has next in order filter coefficients 412.

Figure 4F:
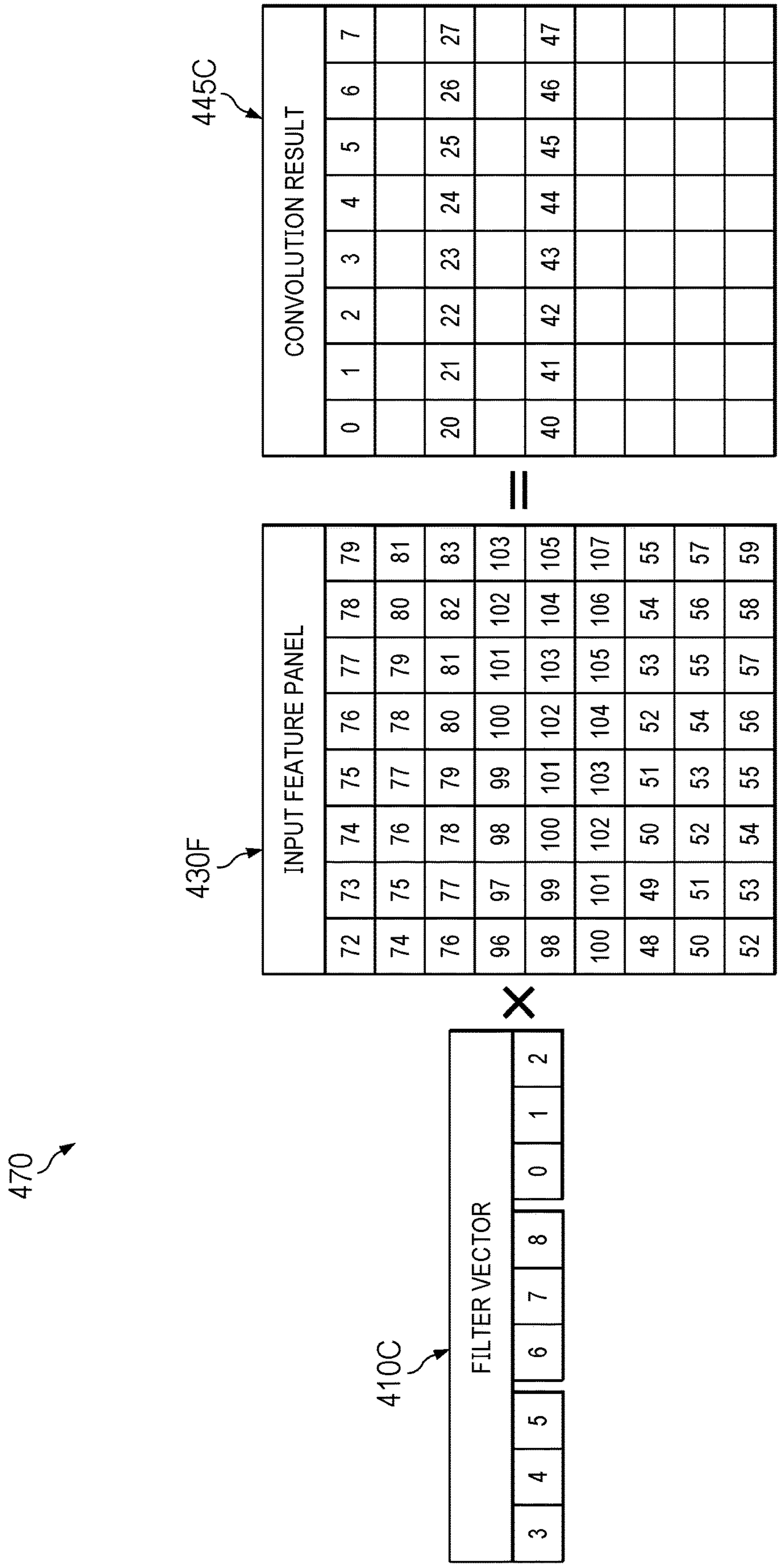

Now turning to FIG. 4F, processors perform computation processes shown in computation environment 470. A hardware accelerator, such as hardware accelerator 127, for example, may convolve filter vector 410C and input feature panel 430F as a third convolution iteration of the first phase. The hardware accelerator generates and stores the output in, for example, convolution result memory 136 as described with respect to FIG. 1. A processor, such as controller 140, may load the convolution result for the iteration into convolution result 445. As shown in convolution result 445C, the controller stores the output in the next row based on selecting a row based on an offset. The offset is selected based on the dilation factor. The rows is selected by shifting down by the offset from the previous row (e.g., the output is in row 5, which is 2 rows down from the last loaded data in row 3).

If there is more data to process, the hardware accelerator and controller continue the process to perform additional convolution iterations in the same manner until the controller shifts dilated filter 420 vertically down to the last row of the input feature map 425 and horizontally to the end of the last row of the input feature map 425. Once all the iterations for the first phase are complete and the controller has loaded the outputs into convolution result 445, the second phase can begin execution.

Figure 4G:
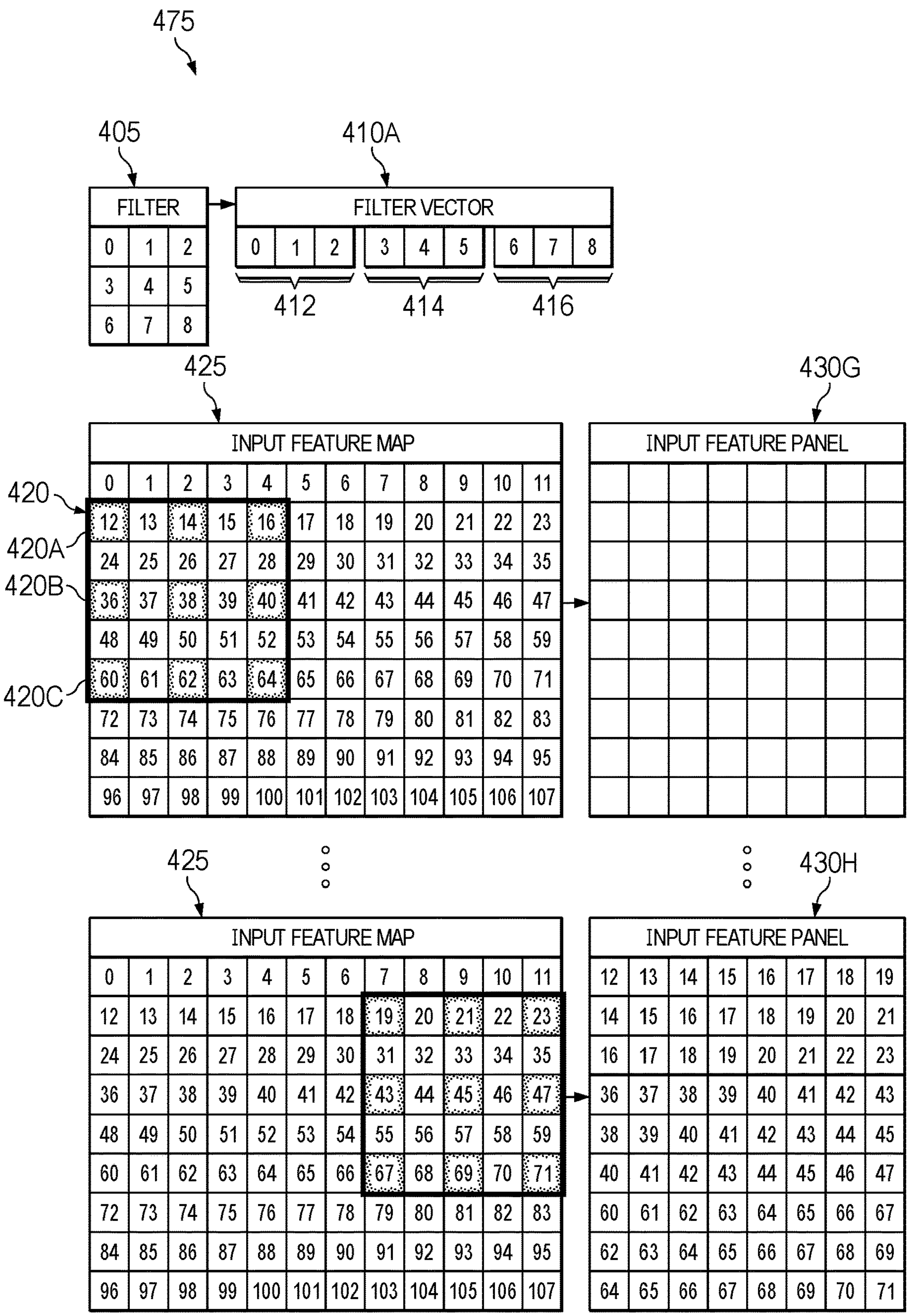

Now turning to FIG. 4G, a controller performs a loading process for the first iteration of the second phase of convolution in loading environment 475. Loading environment 475 includes the same elements as previous loading environments, with some elements storing different data to handle this phase and iteration of convolution.

For the first iteration in each phase, the controller shifts dilated filter 420 to an uppermost row of input feature map 425 that has not yet had the dilated filter 420 applied. In this example, because the second row of dilated filter 420 contains all null values, and the first phase shifted the dilated filter 420 vertically down two rows (since the dilation factor is 2), the uppermost row that has not yet been analyzed or had the dilated filter 420 applied is the second row of the input feature map 425. Accordingly, the controller aligns row 420A of the dilated filter 420 with the second row of the input feature map 425. Additionally, as shown in input feature panel 430G, the controller clears input feature panel 430 (or in some embodiments the controller simply ignores the old data and overwrites it with the new data).

In operation, as in the previous loading phases, the controller shifts dilated filter 420 across the rows of input feature map 425 to load data into input feature panel 430G by loading values from input feature map 425 that are overlapped by filter coefficients in dilated filter 420. Upon loading the data as shown in input feature panel 430H, the controller loads filter vector 410A. As the first iteration of a phase, the filter coefficients 412, 414, and 416 are sequentially ordered. In some embodiments, rather than loading a memory with the values for each iteration, three memories (in this example) store each of the three variations of filter vector 410 (e.g., 410A, 410B, and 410C), and the relevant filter vector ordering is used for the given convolution by selecting the correct memory location for the convolution iteration.

Figure 4H:
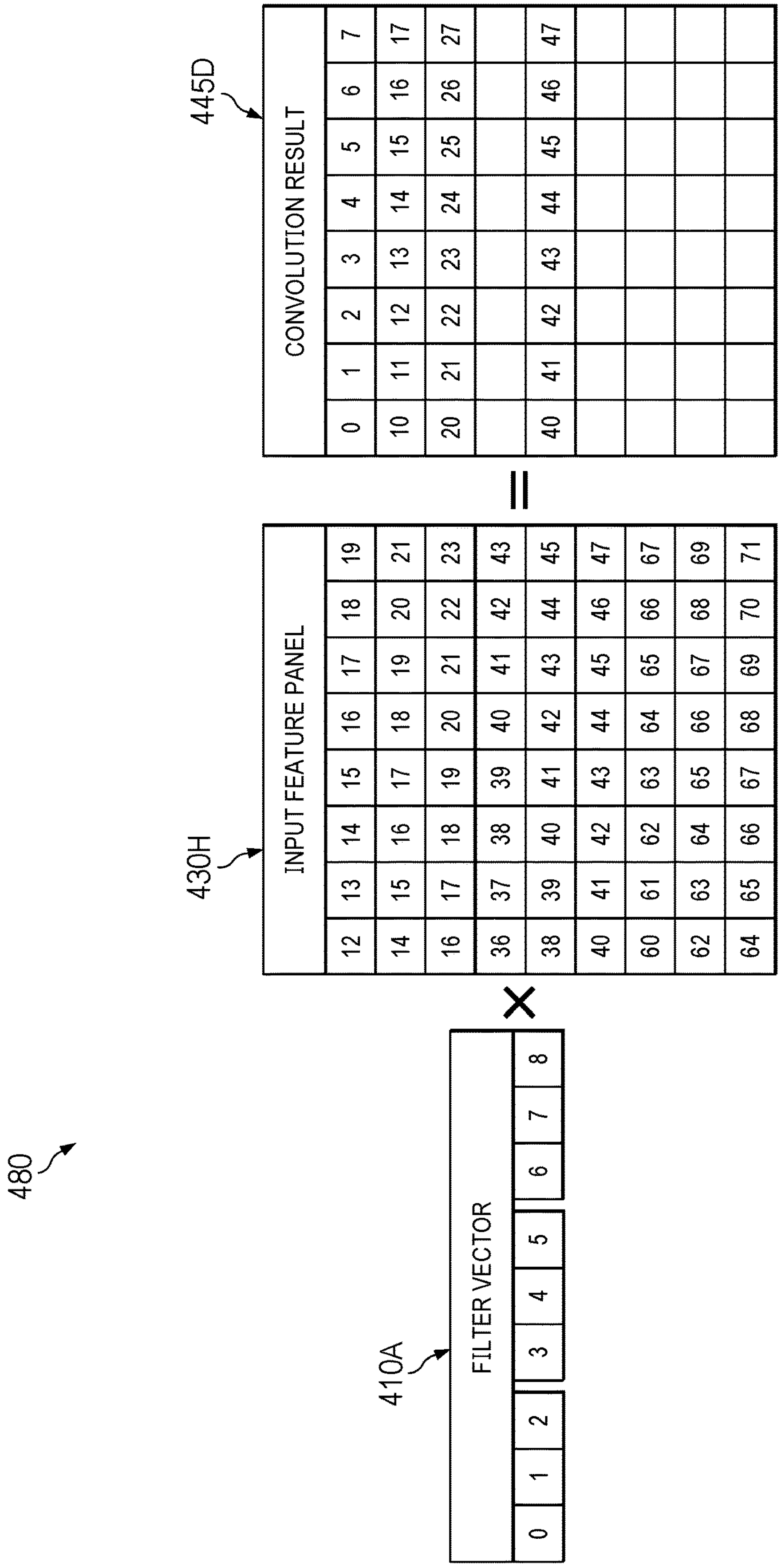

Now turning to FIG. 4H, a processor performs the processes in computation environment 480. A hardware accelerator, for example, may convolve filter vector 410A with input feature panel 430H. The hardware accelerator may store the output from the convolution iteration in a memory such as convolution result memory 136. The controller, such as controller 140, may load the output into the relevant row of convolution result 445. As shown in convolution result 445D, the controller stores the first convolution iteration output for the second phase in the second row of convolution result 445. In other words, the controller stores output from the first iteration of the phase in the uppermost empty row of convolution result 445.

Figure 4I:
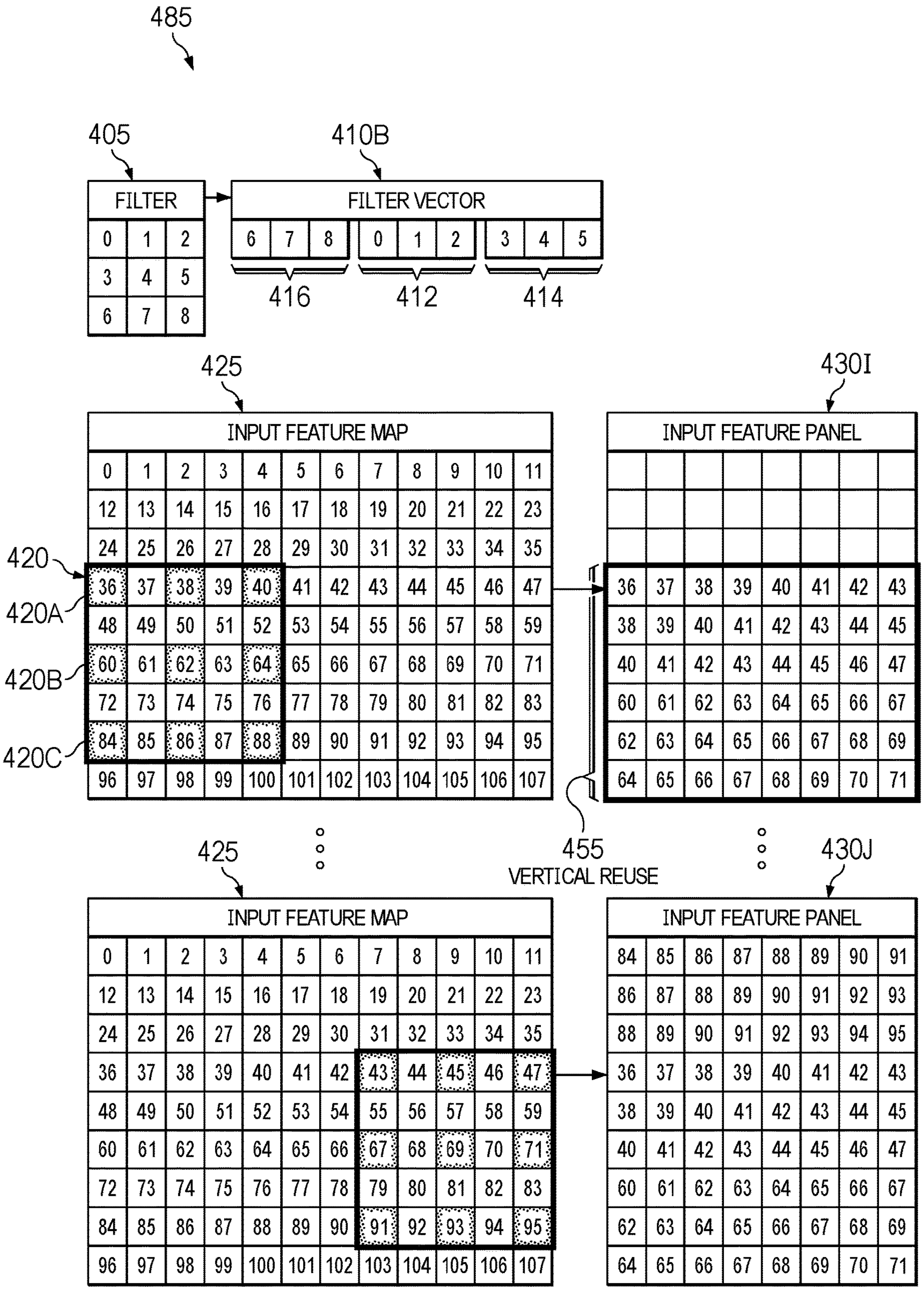

Upon loading output to convolution result 445D, the controller executes the next convolution iteration of the second phase. As illustrated in FIG. 4I, loading environment 485 includes the same elements as the previous loading environments, adjusted based on the convolution iteration to be performed.

Input feature panel 430I stores data from the previously loaded data. In this iteration of the convolution, when the controller shifts dilated filter 420 vertically as described below, the first three rows of the input feature panel will no longer be needed because the dilated filter 420 will not be applied to the corresponding row (i.e., row 2) of the input feature map 425. Accordingly, the controller clears the first three rows of the input feature panel 430I, and the controller saves the six (6) remaining rows for vertical reuse of reuse data 455. To avoid overwriting data that is still needed, the controller loads new data into the first three rows of input feature panel 430, and the controller maintains reuse data 455. As a result, data in input feature panel 430 is out of order in this iteration, and the controller reorders filter coefficients of filter vector 410B to account for the nonsequential data in input feature panel 430. Note that the controller clears the same rows of input feature panel 430 and uses the same filter vector 410B in the second iteration of the second phase as the second iteration of the first phase of the convolution.

To load the new data, the controller shifts dilated filter 420 vertically down input feature map 425 by a rate of the dilation factor. In the example here, the dilation factor is 2, so the controller shifts dilated filter 420 down to align row 420A of the dilated filter 420 with the fourth row of input feature map 425. The controller shifts dilated filter 420 across input feature map 425 to load new values into input feature panel 430I. New values describe values to which the dilated filter 420 is newly applied and are therefore yet to be loaded from input feature map 425 into input feature panel 430. In this example, reuse data 455 was loaded based on data that now corresponds to the rows overlapped by rows 420A and 420B of the dilated filter 420. Thus, the new values loaded from input feature map 425 to input feature panel 430J correspond to data overlapped by row 420C of dilated filter 420. Note that in the first phase, the data in the row corresponding to the dilated filter row 420C was not analyzed because the null values overlapped this row of the input feature map 425 in the first phase.

In operation, the controller shifts dilated filter 420 horizontally across input feature map 425 to load new data into input feature panel 430J. The controller loads new data from input feature map 425 to the empty elements of input feature panel 430I to result in input feature panel 430J.

The controller reorders filter vector 410B to account for the nonsequential ordering of data in the input feature panel 430J. Specifically, the controller reorders filter coefficients 412, 414, and 416 such that the filter coefficients are aligned to the data in which they were applied. As previously described, filter coefficients 412, 414, and 416 correspond to row 420A, 420B, and 420C of dilated filter 420, respectively. As a result, filter coefficients 412, 414, and 416 correspond to the data to which dilated filter 420 was applied. For example, as illustrated in loading environment 450, data loaded via application of row 420C corresponds to the first 3 rows of input feature panel 430D. As a result, the first filter coefficients in filter vector 410B are filter coefficients 416 that correspond to row 420C. Next, data loaded via application of row 420A corresponds to the second 3 rows of input feature panel 430D. As a result, filter vector 410B next has filter coefficients 412. Finally, data loaded via application of row 420B corresponds to the last three rows of input feature panel 430D. As such, filter vector 410B has next in order filter coefficients 414.

Figure 4J:
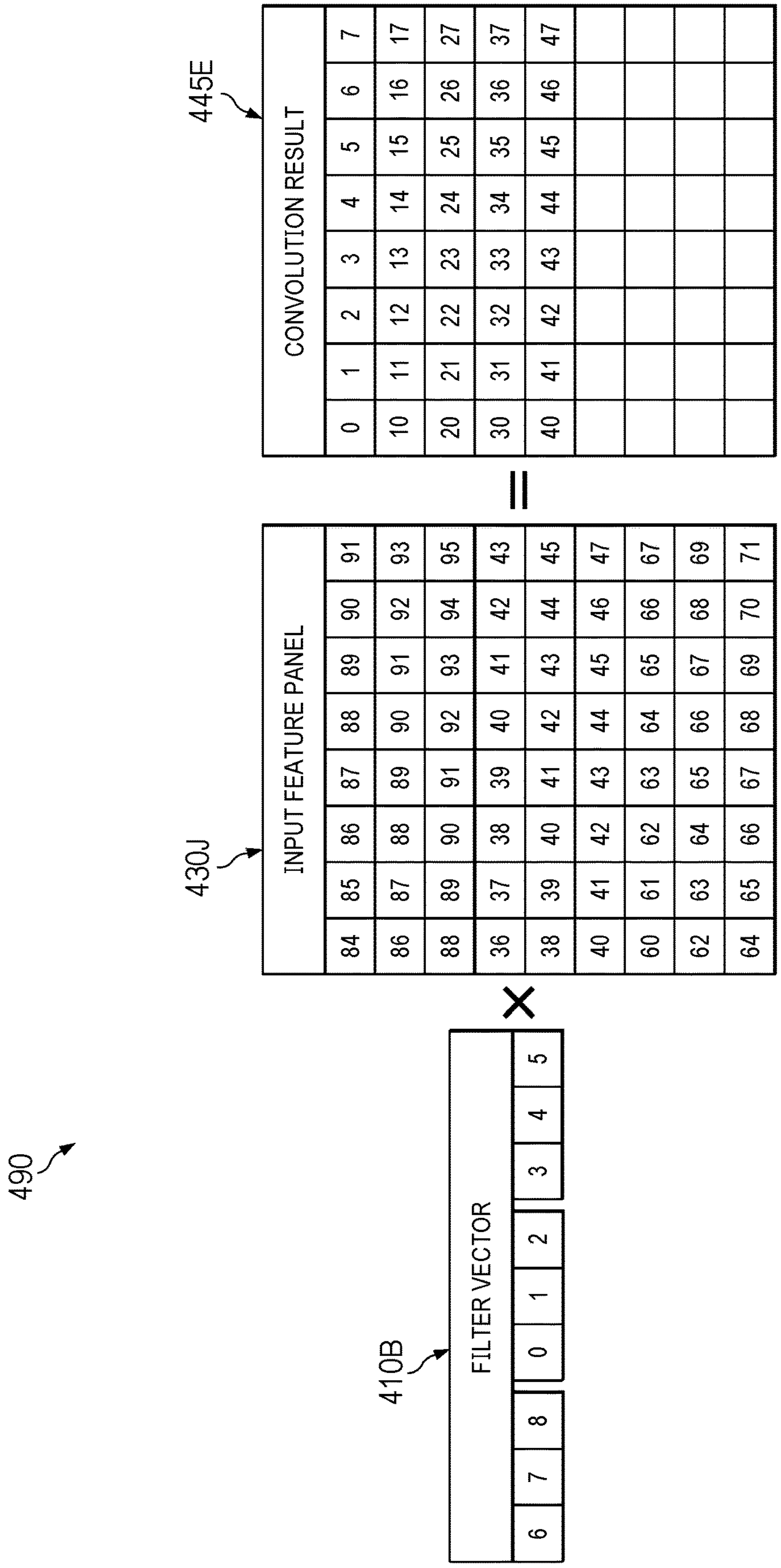

Now turning to FIG. 4J, processing circuitry performs a second iteration of the second phase of convolution. The processing circuitry (e.g., hardware accelerator) convolves filter vector 410B with input feature panel 430J to generate an output. A controller (e.g., controller 140) maps the output to a row that is offset from the last row of loaded data values by the dilation factor. In this example, the dilation factor is 2, so the controller loads the second output into the fourth row of convolution result 445E.

Figure 5:
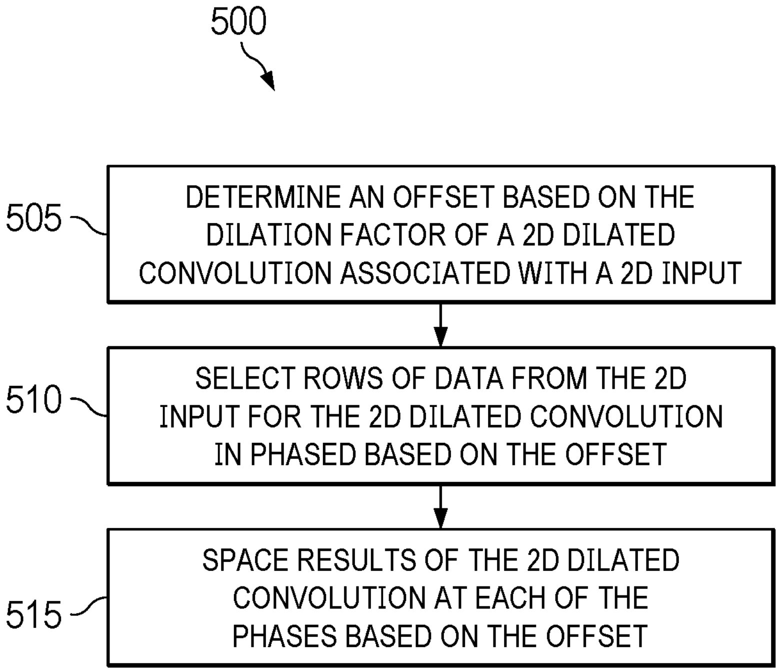
FIG. 5 illustrates a flowchart describing a 2D dilated convolution process, according to some embodiments.

Referring briefly to FIG. 5, convolution process 500 describes an accelerated process of 2D dilated convolution employed by an embedded system (e.g., 2D dilated convolution system 110) or other such computing device, and more specifically by a processor of the embedded system. Convolution process 500 may be implemented in program instructions, stored in memory that, when executed by the processor (e.g., controller 140) direct the embedded system to perform the following functions.

At 505, a processor determines an offset based on a dilation factor of a 2D dilated convolution associated with a 2D input. For example, the 2D input may be image data. Further, as described above, the offset used throughout the loading processes and output processes described in FIGS. 4A-4J was 2 because the dilation factor was 2. Accordingly, the offset equals the dilation factor. Therefore, the processor may determine a dilation factor and use the dilation factor as an offset value.

At 510, the processor selects rows of data from the 2D input for the 2D dilated convolution in phases based on the offset. To perform the convolution, the processor may map the 2D input to a matrix, also referred to as an input feature map. The processor may load data from the input feature map to the input feature panel in phases that allow data reuse. For example, the processor may select the rows from the input feature map and load them into the input feature panel based on the offset using the dilated filter as described in FIGS. 4A, 4C, 4E, 4G, and 4I. Specifically, the processor may shift the dilated filter down the input feature map by the offset to load the data at each iteration to perform a convolution iteration. A 2D dilated convolution system (e.g., hardware accelerator system 120) performs the convolution iteration using, for example, a hardware accelerator, which generates an output of the convolution.

At 515, the processor spaces the results of the 2D dilated convolution at each of the phases based on the offset. For example, as described with respect to FIGS. 4B, 4D, 4F, 4H, and 4J, at each iteration of a phase, the processor places the convolution result in the convolution result matrix nonsequentially. At the beginning of each phase, the processor places the first iteration output in the uppermost empty row of the convolution result matrix. Subsequent iterations are spaced down from the last output row in the output matrix by the offset. The processor follows the process until the entire input has been processed, and the output matrix is complete.

Figure 6:
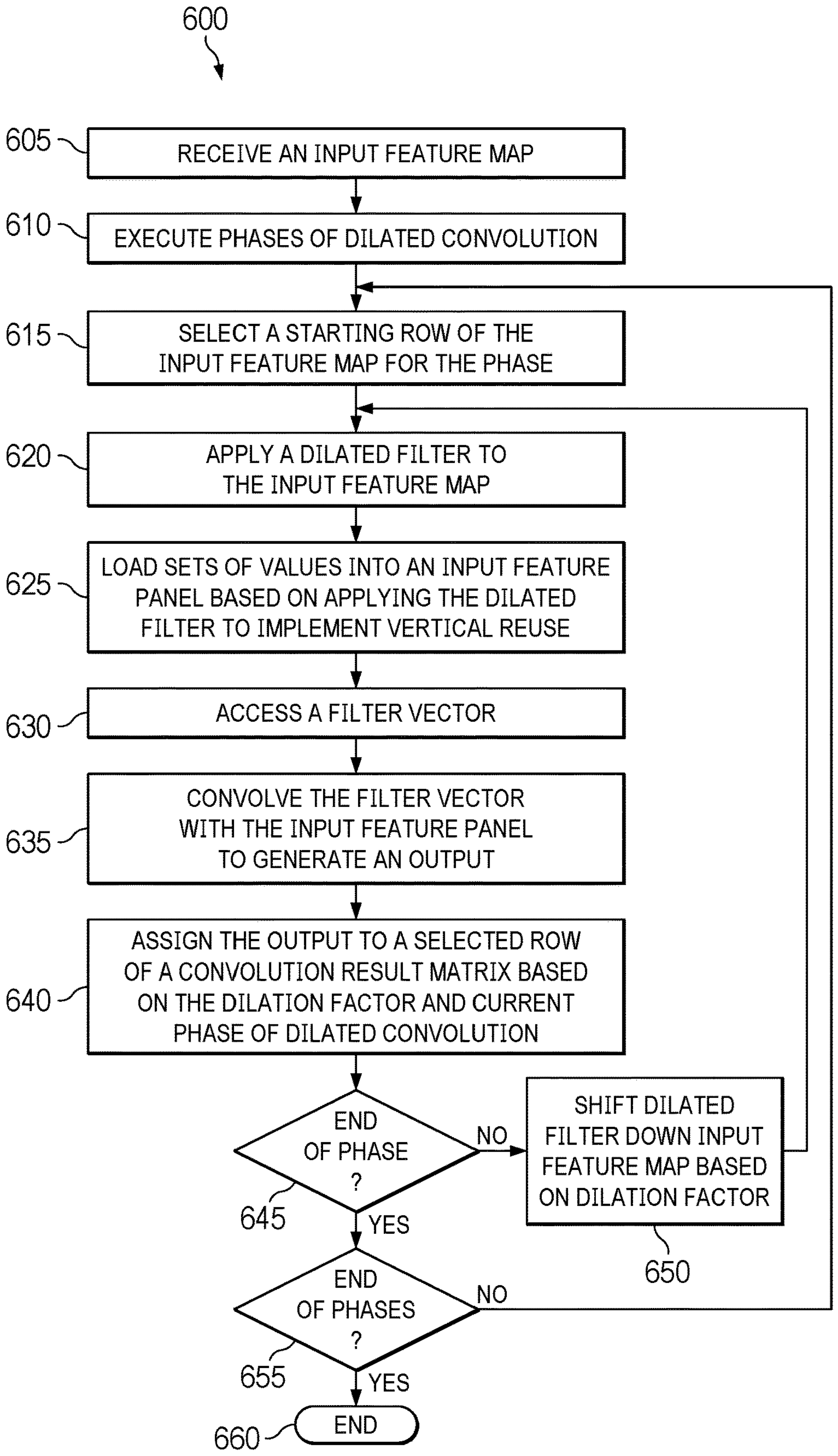
FIG. 6 illustrates another flowchart describing a 2D dilated convolution process, according to some embodiments.

FIG. 6 illustrates a convolution process 600 describing an accelerated method of 2D dilated convolution. In an implementation, convolution process 600 is employed by an embedded system (e.g., 2D dilated convolution system 110) or other such computing device and more specifically by a processor such as controller 140 and a convolution processing system such as hardware acceleration system 120. Convolution process 600 may be implemented in program instructions, stored in memory that, when executed by the processor direct the embedded system to perform the following functions.

At 605, the controller (e.g., controller 140) receives an input feature map (e.g., input feature map 152). In some embodiments the controller receives a 2D input and processes the input to create the input feature map. The input feature map may be a matrix storing values related to a 2D input. For example, the 2D input may include pixel data related to an image. The 2D input is mapped to the elements of the input feature map such that the map is representative of the entire input.

At 610, the controller executes phases of dilated convolution. Phases of convolution include 615 through 645 as iterations of convolution until the end of phase is determined at 650. The number of iterations performed in each phase is dependent on the size of the input feature map and the dilated filter. The number of phases is equal to the dilation factor. For example, a 2D dilated convolution with a dilation factor of 3 will include 3 phases.

At 615, the controller selects a starting row of the input feature map for the phase. The starting row is selected as the uppermost row of the input feature map that has not yet been analyzed. In other words, the uppermost row of the input feature map that has not had weighted values (i.e., filter coefficients) of the dilated filter applied to the row is the first row. Accordingly, for a first phase, the starting row is the top row of the input feature map. For a second phase, the second row of the input feature map is the starting row.

At 620, the controller applies a dilated filter to the input feature map. The dilated filter is a matrix which stores weighted values (i.e., filter coefficients) related to the convolution. For example, in the field of image processing, weighted values could relate to a method of image classification. Weighted values are stored in the dilated filter at a rate of the dilation factor. The dilated filter may be, for example, dilated filter 204, 310, and/or 420. The controller can apply the dilated filter by at least overlaying the dilated filter onto the input feature map to align the rows of the dilated filter with the rows of the input feature map.

At 625, the controller loads sets of values into an input feature panel based on applying the dilated filter to implement vertical reuse. For example, the controller may shift the dilated filter across the row of the input feature map to load values into the input feature panel as described with respect to FIG. 4A. Data from the input feature map that is overlapped by weighted values of the dilated filter is loaded into the input feature panel. In an implementation, data that has previously been loaded to the input feature map is reused to implement vertical reuse without overwriting the data before completing processing. Vertical reuse improves the efficiency of convolution process 600.

At 630, the controller may access the filter vector (e.g., filter vector memory 134, filter vector 315, filter vector 410). Filter vectors store weighted values of the dilated filter in an order based on the location of data within the input feature panel. In some embodiments, the controller loads the filter vector into a memory (e.g., filter vector memory 134) for convolution. In some embodiments, the various reorderings of the filter vector are each stored in memory, and the controller provides an indication as to which filter vector location to use for the particular iteration.

At 635, a convolution processor convolves the filter vector with the input feature panel to generate an output. For example, hardware accelerator 127 may perform the convolution. As examples, a convolution result is generated as shown with respect to FIGS. 4B, 4D, 4F, 4H, and 4J.

At 640, the controller assigns the output to a selected row of a convolution result matrix based on the dilation factor and current phase of dilated convolution. For example, the controller stores a first iteration output of a phase in the uppermost empty row of the convolution result matrix (e.g., convolution result matrix 154, convolution result 445). The controller loads the output into the convolution result matrix for each subsequent iteration by offsetting the output down from the last output iteration by the dilation factor. For example, with a dilation factor of 2, the controller assigns output from subsequent iterations two rows down from the last assigned output as described and shown with respect to FIGS. 4B, 4D, 4F, and 4I.

At 645, the controller decides whether the phase is complete. The phase is complete if the dilated filter has reached the bottom of the input feature map. Once the bottom of the input feature map is reached, the next phase should begin. If the phase is not done (no branch), at 650 the controller shifts the dilated filter down the input feature map based on the dilation factor. For example, if the dilation factor is 3, the controller shifts the dilated filter down 3 rows. Then the next iteration is performed beginning at 620 again with the controller applying the dilated filter to the rows to which the filter was shifted down to.

If the phase is complete (Yes branch), the controller determines whether all phases are done at 655. If the phases are not complete (no branch), the controller starts the next phase of dilated convolution by selecting a starting row for the phase at 615. If all phases are complete (Yes branch), the process ends at 660. Upon the process ending, the controller stores the complete convolution result in the convolution result matrix, and the controller may provide the result to another layer of a DNN or to any other process for use.

FIG. 7 illustrates exemplary result data 700 showing improvements in resource usage with a system employing the accelerated method of 2D dilated convolution described herein. As shown in table 705, the improvement from a previous 2D dilated convolution that did not implement the convolution iterations in phases with vertical reuse as described herein was 12.85% improvement with 6 dilated layers in one embodiment. As shown in the second row of table 705, a second embodiment implementing 6 dilated layers had a 17.63% improvement. In the third row is shown that a third embodiment implementing 9 dilated layers had 11.86% improvement.

Table 710 shows substantial improvement in processor cycles. For example, row 4 shows that the previous implementation processor cycles were 262,542, and the present implementation processor cycles were only 91,252, which is 171,290 fewer processor cycles. Each row has similarly large improvements.

The improvements shown are exemplary data but stand to show that implementation of the present algorithms provide a technical improvement over prior systems.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

This disclosure has attributed functionality to 2D dilated convolution system 110, hardware acceleration system 120, and controller 140. 2D dilated convolution system 110, hardware acceleration system 120, and/or controller 140 may include one or more processors. 2D dilated convolution system 110, hardware acceleration system 120, and/or controller 140 may include any combination of integrated circuitry, discrete logic circuitry, analog circuitry, such as one or more microprocessors, microcontrollers, digital signal processors, application specific integrated circuits, central processing units, graphics processing units, field-programmable gate arrays, and/or any other processing resources. In some examples, 2D dilated convolution system 110, hardware acceleration system 120, and/or controller 140 may include multiple components, such as any combination of the processing resources listed above, as well as other discrete or integrated logic circuitry, and/or analog circuitry.

The techniques described in this disclosure may also be embodied or encoded in an article of manufacture including a non-transitory computer-readable storage medium, such as memory 130 and 150. The term "non-transitory" may indicate that the storage medium is not embodied in a carrier wave or a propagated signal. In certain examples, a non-transitory storage medium may store data that can, over time, change (e.g., in RAM, a cache, or a buffer).

It may be appreciated that, while the inventive concepts disclosed herein are discussed in the context of such productivity applications, they apply as well to other contexts such as gaming applications, virtual and augmented reality applications, business applications, and other types of software applications. Likewise, the concepts apply not just to electronic documents, but to other types of content such as in-game electronic content, virtual and augmented content, databases, and audio and video content.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method comprising:

determining, by a processor, an offset based on a dilation factor of a two-dimensional (2D) dilated convolution associated with 2D input;

selecting, by the processor, rows of data from the 2D input for the 2D dilated convolution in phases based on the offset, comprising loading data into an input feature panel of the 2D dilated convolution based on applying a dilated filter comprising filter coefficients to a set of rows of an input feature map comprising the data from the 2D input, wherein the set of rows is selected based on the offset; and spacing, by the processor, results of the 2D dilated convolution at each of the phases based on the offset.

2. The method of claim 1, wherein determining the offset comprises:

selecting the dilation factor as the offset.

3. The method of claim 1, further comprising:

supplying, by the processor, a filter vector to the 2D dilated convolution.

4. The method of claim 1, wherein loading the data is performed in each phase of a number of.

5. The method of claim 4, further comprising, in each phase of the number of phases:

supplying, by the processor, a filter vector to the 2D dilated convolution, wherein the filter vector comprises the filter coefficients ordered based on the offset and the loading the data.

6. The method of claim 4, further comprising, in each phase of the number of phases:

shifting, by the processor, the dilated filter down a number of rows of the input feature map, wherein the number of rows is equal to the offset, and wherein the loading the data into the input feature panel comprises loading the data to implement vertical reuse; and repeating the loading the data until the dilated filter has been shifted to an end of the input feature map.

7. The method of claim 1, wherein spacing the results of the 2D dilated convolution at each of the phases based on the offset comprises:

storing the results for each phase in rows of a convolution result matrix starting with an uppermost unfilled row and continuing in rows separated by the offset.

8. A system comprising:

a hardware accelerator including:

an input feature panel memory, a convolutional result memory, and a filter vector memory;

a controller; and a memory having stored thereon instructions that, upon execution by the controller, cause the controller to:

receive an input feature map, determine an offset based on a dilation factor, implement a loading plan to carry out more than one phase of 2-dimensional (2D) dilated convolution based on the dilation factor, each phase including:

applying a dilated filter to the input feature map to load values into the input feature panel memory nonsequentially based on the offset for a convolution iteration; and instructing the hardware accelerator to perform the convolution iteration, and implement an output plan including:

retrieving values from the convolutional result memory on completion of the convolution iteration; and storing the values in a row of a convolution result matrix based on the offset.

9. The system of claim 8, further comprising:

a camera, wherein the memory has stored thereon further instructions that, upon execution by the controller, cause the controller to:

access an image captured by the camera; and convert the image into an input feature map.

10. The system of claim 8, wherein the input feature map is a matrix comprising one or more columns and one or more rows.

11. The system of claim 10, wherein the applying the dilated filter to the input feature map comprises shifting the dilated filter horizontally across the input feature map by a factor of 1 until the dilated filter has been shifted to an end of the row of the input feature map.

12. The system of claim 8, wherein the values loaded from the input feature map into the input feature panel memory comprise values from rows of the input feature map to which the dilated filter is newly applied.

13. The system of claim 8, wherein the dilated filter comprises filter coefficients separated by the dilation factor.

14. The system of claim 13, wherein implementing the loading plan further comprises:

loading the filter coefficients into the filter vector memory based on the offset for the convolution iteration.

15. A method of executing dilated convolution, comprising:

receiving, by a controller, an input feature map;

executing a phase of a number of phases of dilated convolution of the input feature map, wherein the number of phases is based on a dilation factor of the dilated convolution, and wherein the executing the phase comprises:

selecting, by the controller, a starting row of the input feature map for the phase, convolving an input feature panel with a filter vector wherein the convolving comprises:

applying, by the controller, a dilated filter to the input feature map, wherein the dilated filter comprises a set of filter coefficients separated by the dilation factor;

loading, by the controller, a set of values into an input feature panel based on applying the dilated filter to a set of rows of the input feature map to implement vertical reuse;

accessing, by a convolution processor, the filter vector comprising the set of filter coefficients;

convolving, by the convolution processor, the filter vector with the input feature panel to generate an output;

assigning, by the controller, the output to a selected row of a convolution result matrix wherein the selected row is selected based on the dilation factor and the phase; and shifting, by the controller, the dilated filter down the input feature map based on the dilation factor, and repeating the convolving until the dilated filter has been shifted to an end of the input feature map; and repeating the executing the phase for each phase of the number of phases.

16. The method of claim 15, wherein to implement vertical reuse, the set of values comprises of values from rows from the input feature map to which the dilated filter is newly applied.

17. The method of claim 15, wherein selecting the starting row comprises selecting an uppermost row of the input feature map that has not yet had dilated filter applied.

18. The method of claim 15, wherein loading the set of values into the input feature panel comprises shifting the dilated filter horizontally across the input feature map by a factor of one, until the dilated filter has been shifted to an end of the row of the input feature map.

19. The method of claim 15, wherein accessing the filter vector further comprises loading, by the controller, the filter coefficients into the filter vector based on the vertical reuse.

20. The method of claim 15, wherein accessing the filter vector comprises:

accessing a memory storing a number of filter vectors wherein each of the number of filter vectors comprises the filter coefficients in a different order; and selecting the filter vector from the number of filter vectors based on the vertical reuse.

* * * * *